United States Patent
Zenko et al.

(10) Patent No.: US 12,372,795 B2
(45) Date of Patent: Jul. 29, 2025

(54) LIGHT GUIDING APPARATUS AND METHOD OF PRODUCING THE SAME

(71) Applicant: NALUX CO., LTD., Osaka (JP)

(72) Inventors: Tetsuya Zenko, Osaka (JP); Norifumi Kanai, Osaka (JP); Shogo Kawano, Osaka (JP)

(73) Assignee: NALUX CO., LTD., Osaka (JP)

( * ) Notice: Subject to any disclaimer, the term of this patent is extended or adjusted under 35 U.S.C. 154(b) by 246 days.

(21) Appl. No.: 18/204,018

(22) Filed: May 31, 2023

(65) Prior Publication Data

US 2023/0324692 A1  Oct. 12, 2023

Related U.S. Application Data

(63) Continuation-in-part of application No. PCT/JP2022/021225, filed on May 24, 2022.

(60) Provisional application No. 63/234,499, filed on Aug. 18, 2021.

(51) Int. Cl.
*G02B 27/01* (2006.01)

(52) U.S. Cl.
CPC .................. *G02B 27/0172* (2013.01)

(58) Field of Classification Search
None
See application file for complete search history.

(56) References Cited

U.S. PATENT DOCUMENTS

| 9,791,703 B1 | 10/2017 | Vallius et al. |
| 11,119,262 B1 | 9/2021 | Levola et al. |
| 2018/0210146 A1 | 7/2018 | Klug et al. |
| 2019/0094551 A1 | 3/2019 | Yaras et al. |
| 2020/0012044 A1 | 1/2020 | Klug et al. |

(Continued)

FOREIGN PATENT DOCUMENTS

| CN | 111025657 A | 4/2020 |
| CN | 111766704 A | 10/2020 |

(Continued)

OTHER PUBLICATIONS

International Search Report and Written Opinion dated Jul. 12, 2022 corresponding to International Patent Application No. PCT/JP2022/021225, with partial English translation.

(Continued)

*Primary Examiner* — Chris H Chu
(74) *Attorney, Agent, or Firm* — SQUIRE PATTON BOGGS (US) LLP

(57) ABSTRACT

A light guiding apparatus comprising: a light guiding substrate; a light receiving unit including first and second units provided on a surface of the substrate, the first and second units transmitting received rays along first and second paths in the substrate as first and second light beams, respectively; a first direction changing unit for the first light beam; a second direction changing unit for the second light beam; and a light emitting unit receiving the first and the second light beams, combining the beams for emission and provided on the surface, wherein on the surface the center of the minimum circle encompassing the first unit is located farther away from the light emitting unit than the center of the minimum circle encompassing the second unit and the first path runs through the portion of the substrate on which the second unit is provided.

14 Claims, 18 Drawing Sheets

(56) References Cited

U.S. PATENT DOCUMENTS

| | | | |
|---|---|---|---|
| 2020/0225498 A1 | 7/2020 | Potnis et al. | |
| 2021/0109273 A1 | 4/2021 | Jiang et al. | |
| 2021/0364806 A1 | 11/2021 | Yaras et al. | |
| 2022/0057638 A1* | 2/2022 | Sato | G02B 27/0172 |
| 2022/0082754 A1 | 3/2022 | Klug et al. | |
| 2022/0214494 A1* | 7/2022 | Levola | G02B 6/0035 |

FOREIGN PATENT DOCUMENTS

| | | | |
|---|---|---|---|
| DE | 4031637 C2 * | 4/1997 | G03F 9/7023 |
| JP | 2020-506419 A | 2/2020 | |
| JP | 2020-536269 A | 12/2020 | |
| WO | 2017/180403 A1 | 10/2017 | |
| WO | 2018/136892 A1 | 7/2018 | |
| WO | 2019/067751 A1 | 4/2019 | |
| WO | 2020/226078 A1 | 11/2020 | |

OTHER PUBLICATIONS

International Search Report and Written Opinion dated Apr. 25, 2023 corresponding to International Patent Application No. PCT/JP2023/004532.

* cited by examiner

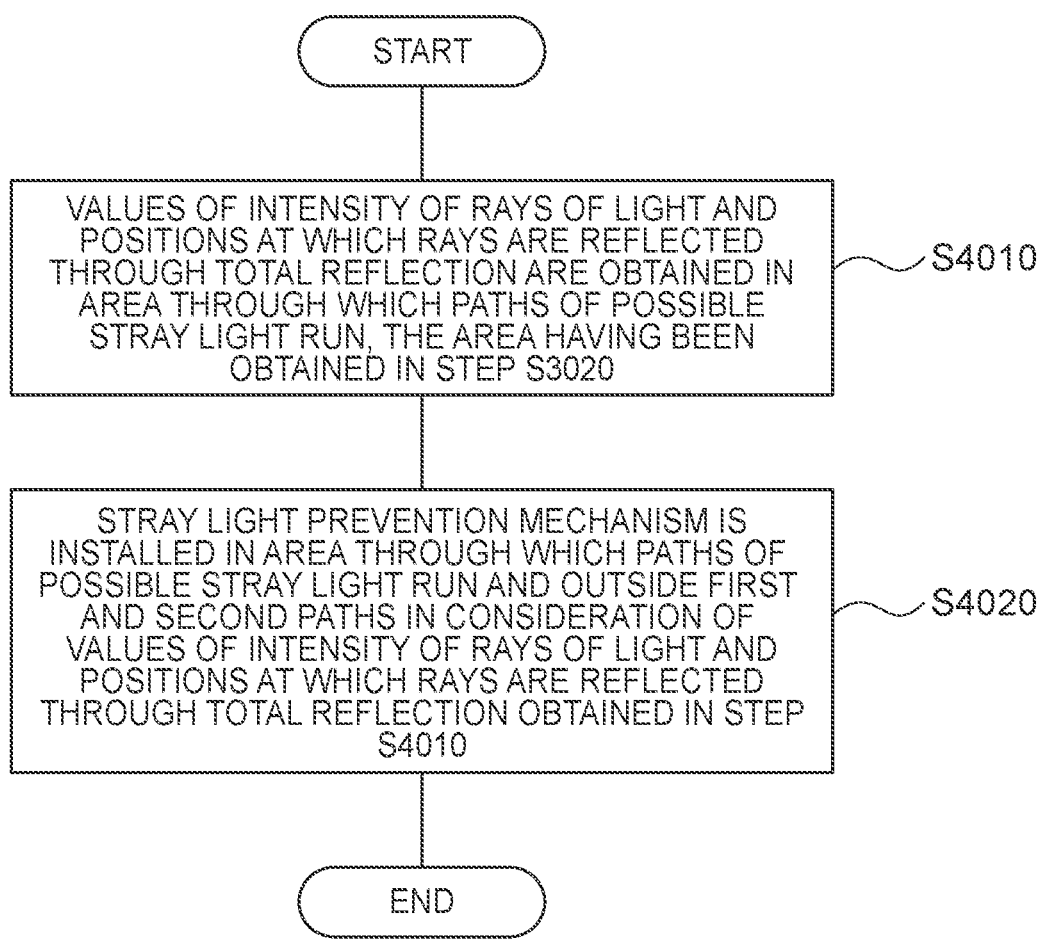

LIGHT GUIDING APPARATUS AND METHOD OF PRODUCING THE SAME

CROSS REFERENCE TO RELATED APPLICATION

This is a Continuation-in-Part of International Patent Application No. PCT/JP2022/021225 filed May 24, 2022, which designates the U.S., and which claims priority from U.S. Provisional Patent Application No. 63/234,499, filed Aug. 18, 2021. The contents of these applications are hereby incorporated by reference.

TECHNICAL FIELD

The present invention relates to a light guiding apparatus used in the augmented reality system and a method of producing the same.

BACKGROUND ART

The augmented reality system in which an image of a virtual object is displayed in such a way that the image is a portion of an image of the environment or the image is overlapped on an image of the environment is used. The augmented reality system is embodied in a head-mounted display or a wearable apparatus of another type, for example.

The augmented reality system includes a light source that forms a virtual image, a light receiving unit that captures the formed virtual image, a light guiding portion that transmits the image captured by the light receiving unit as rays of light and a light emitting unit that receives the rays from the light guiding portion and provides an image reproduced from the rays. A set of the light receiving unit, the light guiding portion and the light emitting unit is referred to as a light guiding apparatus.

Previously various light guiding apparatuses have been developed (Patent documents 1-3). However, a light guiding apparatus having a sufficiently high luminance efficiency concerning light from the light source has not been developed. Accordingly, there is a need for a light guiding apparatus having a sufficiently high luminance efficiency concerning light from the light source and a method of producing the same.

PRIOR ART DOCUMENTS

Patent Documents

Patent document 1: U.S. Pat. No. 9,791,703B1
Patent document 2: US2020/0225498A1
Patent document 3: US2021/0109273A1

The object of the present invention is to provide a light guiding apparatus having a sufficiently high luminance efficiency concerning light from the light source and a method of producing the same.

SUMMARY OF THE INVENTION

A light guiding apparatus according to a first aspect of the present invention includes a light guiding substrate that transmits rays of light through total internal reflection; a light receiving unit including a first unit and a second unit, each of the first unit and the second unit being a one-dimensional diffraction grating provided on a surface of the light guiding substrate, the first unit being configured so as to transmit received rays of light along a first path in the light guiding substrate as a first light beam, and the second unit being configured so as to transmit received rays of light along a second path in the light guiding substrate as a second light beam; a first direction changing unit configured to change the direction of the first light beam, the first direction changing unit being a one-dimensional diffraction grating provided on the surface of the light guiding substrate; a second direction changing unit configured to change the direction of the second light beam, the second direction changing unit being a one-dimensional diffraction grating provided on the surface of the light guiding substrate; and a light emitting unit configured to receive the first light beam from the first direction changing unit and the second light beam from the second direction changing unit and to combine the first light beam and the second light beam for emission of the combined light beam, the light emitting unit being a two-dimensional diffraction grating provided on the surface of the light guiding substrate. The light guiding apparatus according to the present invention is configured such that on the surface of the light guiding substrate the center of the minimum circle encompassing the first unit is located farther away from the light emitting unit than the center of the minimum circle encompassing the second unit and the first path runs through the portion of the light guiding substrate on which the second unit is provided.

Since the light guiding apparatus according to the first aspect of the present invention is configured such that on the surface of the light guiding substrate the center of the minimum circle encompassing the first unit is located farther away from the light emitting unit than the center of the minimum circle encompassing the second unit and the first path runs through the portion of the light guiding substrate on which the second unit is provided, diffraction efficiency of light received by the light receiving unit can be made greater than in the case of conventional light guiding apparatuses in which a path along which rays of light travel from one of the first unit and the second unit to the light emitting unit does not run through the portion of the light guiding substrate on which the other is provided. Further, since the path along which rays of light travel from the first unit to the light emitting unit runs through the portion of the light guiding substrate on which the second unit is provided, a way of dividing the light receiving unit into the first unit and the second unit can be much more flexibly determined than in the case of conventional light guiding apparatuses in which a path along which rays of light travel from one of the first unit and the second unit to the light emitting unit does not pass through the portion of the light guiding substrate on which the other is provided. Accordingly, efficiency of light from the light source can be made greater by changing a way of dividing the light receiving unit into the first unit and the second unit.

In the light guiding apparatus according to a first embodiment of the first aspect of the present invention, in an area of the light receiving unit on the surface, the area being located farther away from the light emitting unit than the straight line that passes through the center of the minimum circle encompassing the light receiving unit and is parallel to grooves of the diffraction grating of the first unit, the second unit occupies 2% or more.

In the present embodiment, by making the second unit occupy 2% or more in the area of the light receiving unit on the surface, the area being located farther away from the light emitting unit than the straight line that passes through the center of the minimum circle encompassing the light receiving unit and is parallel to grooves of the diffraction grating of the first unit, efficiency of light from the light source can be made greater than in the case that the straight line that passes through the center of the minimum circle encompassing the light receiving unit and is parallel to grooves of the diffraction grating of the first unit is defined as the boundary line between the first unit and the second unit.

In the light guiding apparatus according to a second embodiment of the first aspect of the present invention, in an area of the light receiving unit on the surface, the area being located closer to the light emitting unit than the straight line that passes through the center of the minimum circle encompassing the light receiving unit and is parallel to grooves of the diffraction grating of the first unit, the first unit occupies 10% or more.

In the present embodiment, by making the first unit occupy 10% or more of the area of the light receiving unit on the surface, the area being located closer to the light emitting unit than the straight line that passes through the center of the minimum circle encompassing the light receiving unit and is parallel to grooves of the diffraction grating of the first unit, efficiency of light from the light source can be made greater than in the case that the straight line that passes through the center of the minimum circle encompassing the light receiving unit and is parallel to grooves of the diffraction grating of the first unit is defined as the boundary line between the first unit and the second unit.

In the light guiding apparatus according to a third embodiment of the first aspect of the present invention, on the surface of the light guiding substrate line segments of the border line between the first unit and the second unit of the light receiving unit are defined so as to have two or more points of intersection with a straight line parallel to grooves of the first unit of the light receiving unit.

In the light guiding apparatus according to a fourth embodiment of the first aspect of the present invention, on the surface of the light guiding substrate all line segments of the border line between the first unit and the second unit are not parallel to one another and the maximum value of a difference in angle of a line segment or a tangential line of the border line with respect to a reference direction is 75 degrees or greater.

In the present embodiment, by making the maximum value of difference in angle of line segments or tangential lines of the border line with respect to a reference direction 75 degrees or greater, efficiency of light from the light source can be made greater than in the case that a straight line that passes through the center of the minimum circle encompassing the light receiving unit is defined as the boundary line between the first unit and the second unit.

In the light guiding apparatus according to a fifth embodiment of the first aspect of the present invention, on the surface of the light guiding substrate at least one of the first unit and the second unit has two portions that are separated from each other by the other.

In the present embodiment, by making at least one of the first unit and the second unit have two portions that are separated from each other by the other of the first unit and the second unit, efficiency of light from the light source can be made greater than in the case that a straight line that passes through the center of the minimum circle encompassing the light receiving unit is defined as the boundary line between the first unit and the second unit.

In the light guiding apparatus according to a sixth embodiment of the first aspect of the present invention, an angle of inclination of grooves of the one-dimensional grating of the first unit from a y-axis is 5 degrees or smaller and an angle of inclination of grooves of the one-dimensional grating of the second unit from an x-axis is 15 degrees or smaller where the x-axis is defined so as to be parallel to the horizontal direction in use and the y-axis is defined so as to be parallel to the vertical direction in use.

In the light guiding apparatus according to a seventh embodiment of the first aspect of the present invention, the period of the one-dimensional grating of the first unit is equal to or smaller than the period of the one-dimensional grating of the second unit.

In the light guiding apparatus according to an eighth embodiment of the present invention, of an area of the light receiving unit on the surface, the area being located farther away from the light emitting unit than the straight line that passes through the center of the minimum circle encompassing the light receiving unit and is parallel to the direction designed to be vertical when the apparatus is in use, the second unit occupies 2% or more.

In the present embodiment, by making the second unit occupy 2% or more of the area of the light receiving unit on the surface, the area being located farther away from the light emitting unit than the straight line that passes through the center of the minimum circle encompassing the light receiving unit and is parallel to the direction designed to be vertical when the apparatus is in use, efficiency of light from the light source can be made greater than in the case that a straight line that passes through the center of the minimum circle encompassing the light receiving unit is defined as the boundary line between the first unit and the second unit.

In the light guiding apparatus according to a ninth embodiment of the first aspect of the present invention, of an area of the light receiving unit on the surface, the area being located closer to the light emitting unit than the straight line that passes through the center of the minimum circle encompassing the light receiving unit and is parallel to the direction designed to be vertical when the apparatus is in use, the first unit occupies 10% or more.

In the present embodiment, by making the first unit occupy 10% or more of the area of the light receiving unit on the surface, the area being located closer to the light emitting unit than the straight line that passes through the center of the minimum circle encompassing the light receiving unit and is parallel to the direction designed to be vertical when the apparatus is in use, efficiency of light from the light source can be made greater than in the case that a straight line that passes through the center of the minimum circle encompassing the light receiving unit is defined as the boundary line between the first unit and the second unit.

In the light guiding apparatus according to a tenth embodiment of the first aspect of the present invention, a stray light prevention mechanism is installed in an area through which paths of rays of light that enter the first unit, travel in the light guiding substrate as the first order diffracted light of both of the first and second units and can reach the light emitting unit run and outside the first and second paths.

Since the light guiding apparatus according to the present embodiment is provided with the stray light prevention mechanism in the area through which paths of rays of light that enter the first unit, travel in the light guiding substrate as the first order diffracted light of both of the first and second units and can reach the light emitting unit run and outside the first and second paths, stray light that travels in the light guiding substrate as the first order diffracted light of both of the first and second units can be effectively prevented.

A method of producing a light guiding apparatus according to the second aspect of the present invention, the light guiding apparatus including: a light guiding substrate that transmits rays of light through total internal reflection; a light receiving unit including a first unit and a second unit, each of the first unit and the second unit being a one-dimensional diffraction grating provided on a surface of the light guiding substrate, the first unit being configured so as to transmit received rays of light along a first path in the light guiding substrate as a first light beam, and the second unit being configured so as to transmit received rays of light along a second path in the light guiding substrate as a second light beam; a first direction changing unit configured to change the direction of the first light beam, the first direction changing unit being a one-dimensional diffraction grating provided on the surface of the light guiding substrate; a second direction changing unit configured to change the direction of the second light beam, the second direction changing unit being a one-dimensional diffraction grating provided on the surface of the light guiding substrate; and a light emitting unit configured to receive the first light beam from the first direction changing unit and the second light beam from the second direction changing unit and to combine the first light beam and the second light beam for emission of the combined light beam, the light emitting unit being a two-dimensional diffraction grating provided on the surface of the light guiding substrate, wherein on the surface of the light guiding substrate the center of the minimum circle encompassing the first unit is located farther away from the light emitting unit than the center of the minimum circle encompassing the second unit and the first path runs through the portion of the light guiding substrate on which the second unit is provided, the method comprising the steps of: obtaining a range of angle of incidence and an area of positions of incidence of incident rays of light that can travel in the light guiding substrate as the first order diffracted light of both of the first and the second units; determining an area through which paths of rays of possible stray light that reach the light emitting unit run among the rays of light that can travel in the light guiding substrate as the first order diffracted light of both of the first and the second units; and installing a stray light prevention mechanism in the area through which paths of rays of possible stray light run and outside first and second paths.

Since the method of producing a light guiding apparatus according to the present aspect includes the steps of determining an area through which paths of rays of possible stray light that reach the light emitting unit run among the rays of light that can travel in the light guiding substrate as the first order diffracted light of both of the first and the second units; and installing the stray light prevention mechanism in the area through which paths of rays of possible stray light run and outside first and second paths, stray light that travels in the light guiding substrate as the first order diffracted light of both of the first and second units can be effectively prevented.

In the method of producing a light guiding apparatus according to a first embodiment of the second aspect of the present invention values of intensity of rays of light are obtained in the area through which paths of rays of possible stray light run and the stray light prevention mechanism is installed in the area through which paths of rays with values of intensity that are greater than a predetermined value run.

By the present embodiment rays of possible stray light with values of intensity that are greater than a predetermined value can be effectively prevented.

In the method of producing a light guiding apparatus according to a second embodiment of the second aspect of the present invention in the step of installing a stray light prevention mechanism, positions at which respective rays are reflected through total reflection are obtained in the area through which paths of rays of possible stray light run and the stray light prevention mechanism is installed in the vicinity of the positions at which rays of light are reflected through total reflection.

In the present embodiment stray light can be effectively prevented by installing a diffraction grating, a metasurface and the like in the vicinity of the positions at which rays of light are reflected through total reflection.

BRIEF DESCRIPTION OF DRAWINGS

FIG. 29 is a flow chart for describing step S2020 of FIG. 23.

DESCRIPTION OF EMBODIMENTS

Figure 1:
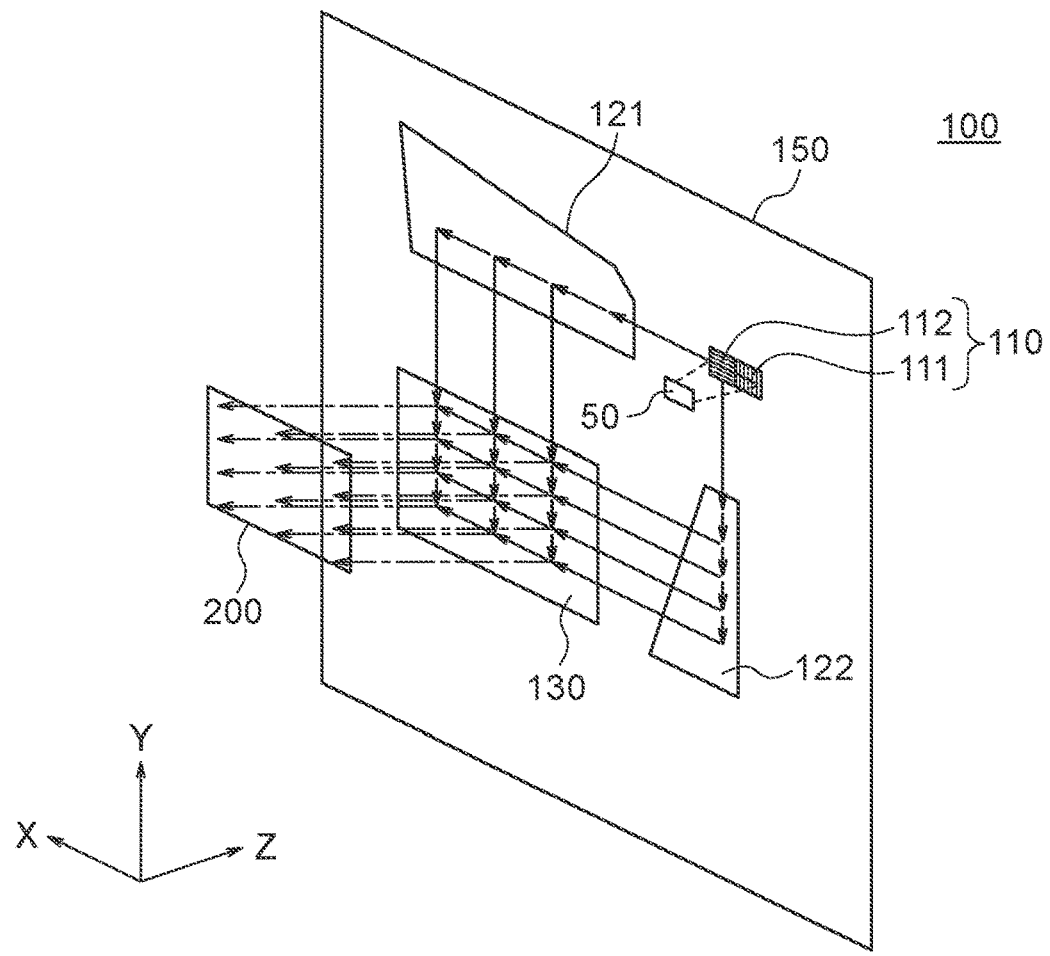
FIG. 1 shows a perspective view of a light guiding apparatus according to the present invention.

FIG. 1 shows a perspective view of a light guiding apparatus 100 according to the present invention.

Figure 2:
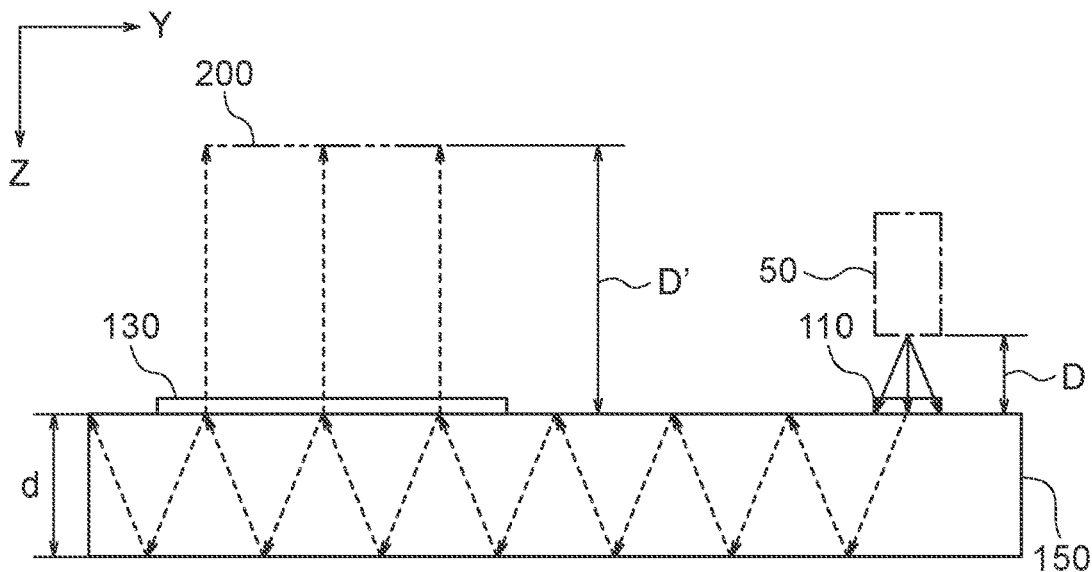
FIG. 2 shows a cross section of the light guiding apparatus according to the present invention.

FIG. 2 shows a cross section of the light guiding apparatus 100 according to the present invention.

The light guiding apparatus 100 is provided with a light guiding substrate 150 and a light receiving unit 110, a first direction changing unit 121, a second direction changing unit 122 and a light emitting unit 130 provided on the light guiding substrate 150. What is referred to as a light guiding substrate can be a light guiding plate or a waveguide. The light receiving unit 110 is provided with a first unit 111 and a second unit 112. Each of the first unit 111 and the second unit 112 is a one-dimensional diffraction grating on a surface of the light guiding substrate 150. Each of the first direction changing unit 121 and the second direction changing unit 122 is a one-dimensional diffraction grating on the surface. The light emitting unit 130 is a two-dimensional diffraction grating on the surface.

A light source 50 is configured such that it forms an image on the light receiving unit 110. The light source 50 can be a laser light source that forms an image on the light receiving unit 110 by scanning the portion with a laser beam. In FIG. 2 the distance between the light source 50 and the light guiding substrate 150 is represented by D. The light received by the first unit 111 of the light receiving unit 110 is taken in the light guiding substrate 150 as diffracted light and transmitted through total reflection in the light guiding substrate 150 to the first direction changing unit 121. In FIG. 2 a thickness of the light guiding substrate 150 is represented by d. The traveling direction of the light that has reached the first direction changing unit 121 is changed by the first direction changing unit 121 and then transmitted to the light emitting unit 130. The light received by the second unit 112 of the light receiving unit 110 is taken in the light guiding substrate 150 as diffracted light and transmitted through total reflection in the light guiding substrate 150 to the second direction changing unit 122. The traveling direction of the light that has reached the second direction changing unit 122 is changed by the second direction changing unit 122 and then transmitted to the light emitting unit 130. The light emitting unit 130 combines the light received from the first direction changing unit 121 and the light received from the second direction changing unit 122 to form an image in an eye box 200. The eye box 200 refers to an area in which a complete image can be obtained even if the pupil of an observer moves. In FIG. 2 a distance between the eye box 200 and the light guiding substrate 150 is represented by D'. In FIG. 2 the path of a ray of light in the light guiding substrate 150 is intended to show how total reflection occurs in the light guiding substrate 150 and does not show the actual path.

Figure 3:
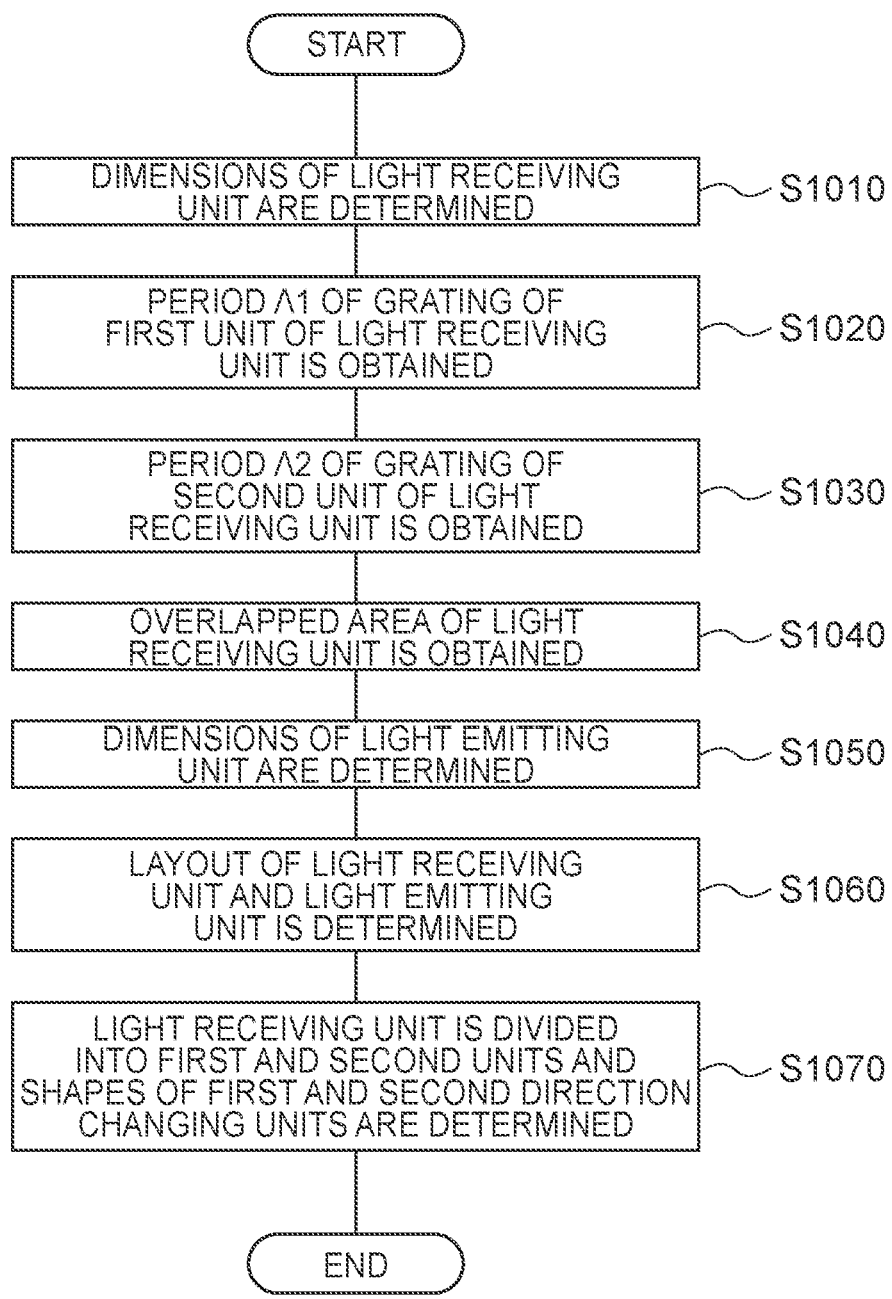
FIG. 3 is a flow chart for explaining a method to design a light guiding apparatus according to the present invention.

FIG. 3 is a flow chart for explaining a method to design a light guiding apparatus according to the present invention.

In step S1010 of FIG. 3 dimensions of the light receiving unit 110 are determined.

Figure 4:
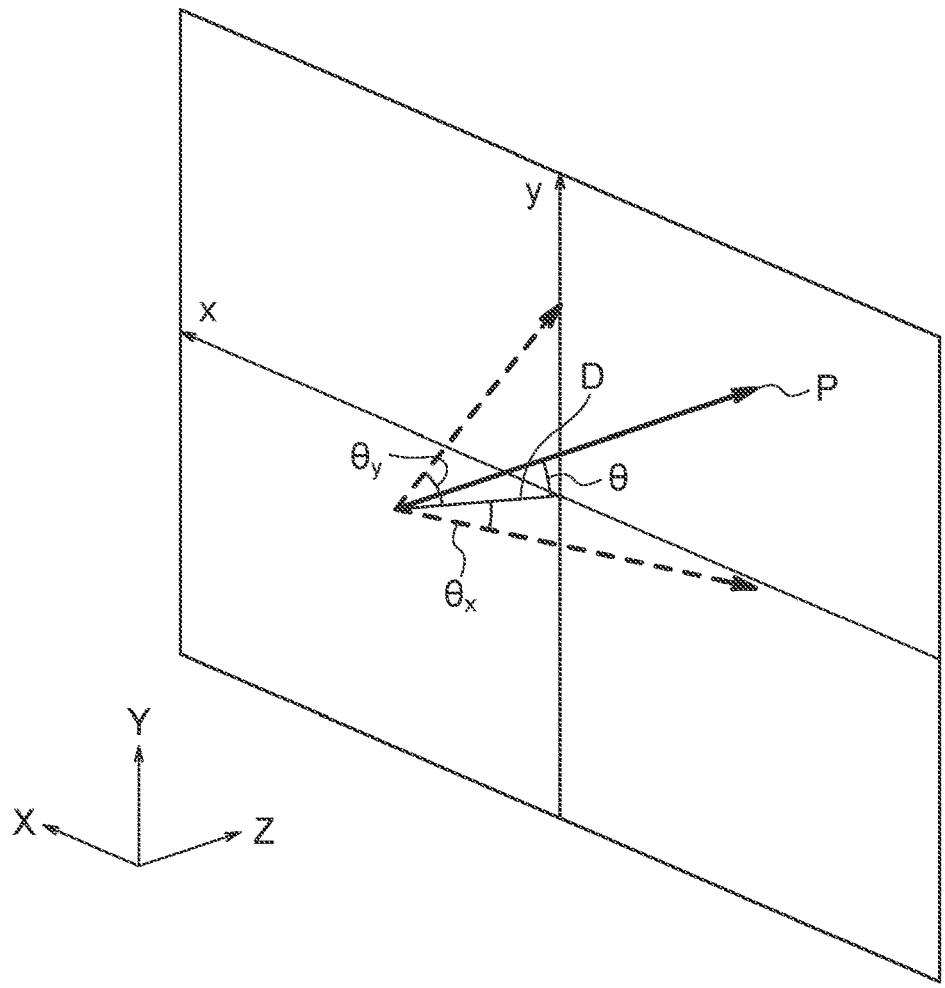
FIG. 4 is a diagram for explaining coordinates used in the specification.

FIG. 4 is a diagram for explaining coordinates used in the specification. An x-axis is defined so as to be parallel to the horizontal direction in use and a y-axis is defined so as to be parallel to the vertical direction in use. Coordinates along the x-axis is defined such that the coordinate of the light emitting unit 130 is greater than the coordinate of the light receiving unit 110, and coordinates along the y-axis is defined such that the coordinate of the light emitting unit 130 is smaller than the coordinate of the light receiving unit 110. The point of intersection of the x-axis and the y-axis is regarded as the origin, and a z-axis is defined such that it is orthogonal to the both axes.

By way of example, the center of the light receiving surface of the light receiving unit 110 is regarded as the origin, and the x-axis and the y-axis are determined on the light receiving surface. The center of the light source 50 is located on the z-axis and a distance D away from the origin. Coordinates along the z-axis are determined such that the coordinate of the center of the light source 50 is smaller than the coordinate of the origin. An angle of incidence of a ray of light which is emitted from the center of the light source 50 and reaches a point P on the light receiving surface of the light receiving unit 110 is represented by θ. The x component of θ and the y component of θ are represented respectively by θx and θy. Each of θx and θy is regarded as positive when a ray of light travels in such a way that the coordinate increases before entering the surface. In FIG. 4 θx is negative and θy is positive.

A length in the x-axis direction and a length in the y-axis direction of the light receiving unit 110 are determined respectively by the following expressions.

$$L1_x = 2 \cdot D \cdot \tan \theta_{xmax} + L10_x/2$$

$$L1_y = 2 \cdot D \cdot \tan \theta_{ymax} + L10_y/2$$

where

D: Distance from the light source to the origin

L10x Length in the x-axis direction of the light source

L10y Length in the y-axis direction of the light source

θxmax Maximum value of the absolute value of θx

θymax Maximum value of the absolute value of θy

In step S1020 of FIG. 3 a period Λ1 of the grating of the first unit 111 of the light receiving unit 110 is obtained. It is assumed that the grooves of the diffraction grating of the first unit 111 are parallel to the y-axis.

Figure 5:
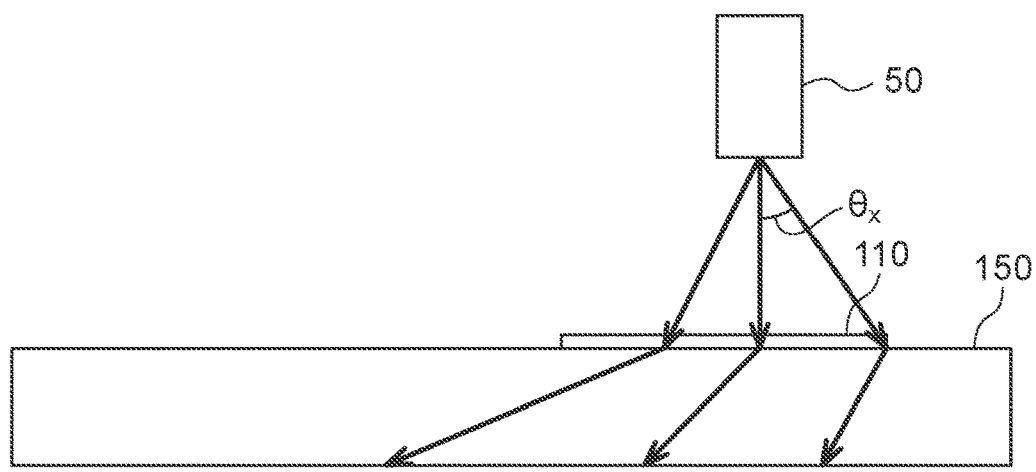
FIG. 5 shows rays of light that have been emitted from the center of the emitting surface of the light source, have entered the light guiding substrate through the light receiving surface of the light receiving unit and are traveling in the light guiding substrate.

FIG. 5 shows rays of light that have been emitted from the center of the emitting surface of the light source 50, have entered the light receiving surface of the light receiving unit 110 and travels in the light guiding substrate 150 in an xz cross section. Since in FIG. 5 coordinates along the x-axis are determined in such a way that the coordinate of the light emitting unit 130 is greater than the coordinate of the light receiving unit 110, the traveling direction of the ray that travels in the light guiding substrate 150 is a direction that increases the value of coordinate along the x-axis. Further, the value of θx is negative.

Figure 6:
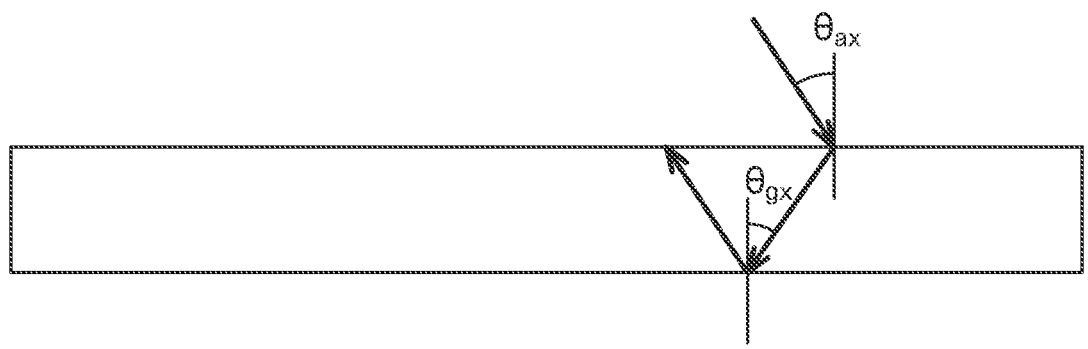
FIG. 6 shows an angle of incidence $\theta ax$ of a ray of light that enters the light guiding substrate and an angle of incidence $\theta gx$ inside the light guiding substrate of a ray of light that has entered the light guiding substrate in an xz cross section.

FIG. 6 shows an angle of incidence θax of a ray of light that enters the light guiding substrate 150 and an angle of incidence θgx inside the light guiding substrate 150 of the ray of light that has entered the light guiding substrate 150 in the xz cross section. For the sake of simplicity, the light receiving unit 110 is not shown in FIG. 6. The grooves of the diffraction grating are perpendicular to the surface of the sheet. The diffraction is expressed by the following expression. Since the ray of light travels in such a way that the x coordinate decreases before entering the light receiving unit 110 in the case of FIG. 6, the value of θax is negative.

$$-n_a \cdot \sin\theta_{ax} + n_g \cdot \sin\theta_{gx} = \frac{m \cdot \lambda}{\Lambda} \quad (1)$$

where
   $n_a$ Refractive index of air
   $n_g$ Refractive index of the light guiding substrate
   θax Angle of incidence at the light receiving surface of the light receiving unit in the xz cross section
   θgx Angle of incidence inside the light guiding substrate in the xz cross section
   m Order of diffraction, m=1
   λ Wavelength of rays of light
   Λ Period of the grating When the angle of incidence θgx inside the light guiding substrate 150 is equal to or greater than the critical angle in FIG. 6, a ray of light that has entered the light guiding substrate 150 through the light receiving surface can travel in the light guiding substrate 150 while repeating total reflection as shown in FIG. 2. Accordingly, the angle of incidence θax at the light receiving surface must be determined in such a way that the angle of incidence θgx inside the light guiding substrate 150 is equal to or greater than the critical angle.

By substituting the value of critical angle into θgx of Expression (1), the following expression can be obtained.

$$-\sin\theta_{ax} + 1 = \frac{\lambda}{\Lambda} \quad (2)$$

In Expression (2) the value of Λ is obtained by substituting the maximum angle of incidence −θxmax in the xz cross section into θax, and the value is represented by Λ1. As described above, θxmax is the absolute value. According to Expression (1), θgx increases as θax increases (the absolute value of θax decreases) when the period of the grating is Λ1. Accordingly, when θax is equal to or greater than −θxmax, θgx is equal to or greater than the critical angle and the ray of light can travel in the light guiding substrate 150 while repeating total reflection.

In general the absolute value of angle of incidence that makes θgx equal to or greater than the critical angle increases by reducing the period of the grating.

In step S1030 of FIG. 3 a period Λ2 of the grating of the second unit 112 of the light receiving unit 110 is obtained. It is assumed that the grooves of the diffraction grating of the second unit 112 are parallel to the x-axis. Since coordinates along the y-axis are determined in such a way that the coordinate of the light emitting unit 130 is smaller than the coordinate of the light receiving unit 110, the traveling direction of the ray that travels in the light guiding substrate 150 is a direction that reduces the value of coordinate along the y-axis.

Figure 7:
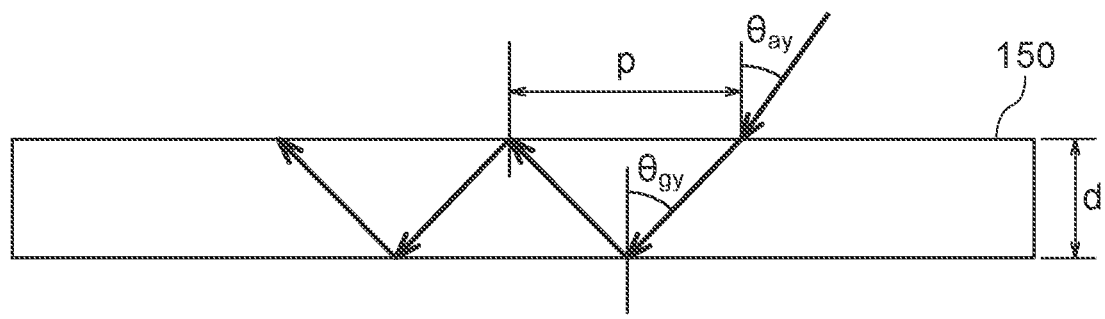
FIG. 7 shows an angle of incidence $\theta ay$ of a ray of light that enters the light guiding substrate and an angle of incidence $\theta gy$ inside the light guiding substrate of a ray of light that has entered the light guiding substrate in a yz cross section.

FIG. 7 shows an angle of incidence θay of a ray of light that enters the light guiding substrate 150 and an angle of incidence θgy inside the light guiding substrate 150 of the ray of light that has entered the light guiding substrate 150 in a yz cross section. The pitch p shown in FIG. 7 indicates the interval in the yz cross section between points at which the ray of light is reflected through total reflection inside the light guiding substrate 150. For the sake of simplicity, the light receiving unit 110 is not shown in FIG. 7. The grooves of the diffraction grating are perpendicular to the surface of the sheet. The diffraction is expressed by the following expression. Since the ray of light travels in such a way that the y coordinate decreases before entering the light receiving unit 110 in the case of FIG. 7, the value of θay is negative.

$$n_a \cdot \sin\theta_{ay} + n_g \cdot \sin\theta_{gy} = \frac{m \cdot \lambda}{\Lambda} \quad (1)'$$

where
   θay Angle of incidence at the light receiving surface of the light receiving unit in the yz cross section
   θgy Angle of incidence inside the light guiding substrate in the yz cross section The pitch p must have a value that is equal to or smaller than the size of the pupil in order to provide an observer with a stable image. The angle of incidence θgy inside the light guiding substrate, which corresponds to the pitch that is equal to the size of the pupil is referred to as an angle of pitch θp. The angle of pitch θp is obtained by the following expression using the pitch p that is equal to the size of the pupil.

$$\theta_p = a\tan\left(\frac{p}{2d}\right)$$

By substituting the value of θp into θgy of Expression (1)', the following expression can be obtained.

$$\sin\theta_{ay} + n_g \cdot \sin\theta_p = \frac{\lambda}{\Lambda} \quad (3)'$$

In Expression (3)' an appropriate value is given to the period of the grating Λ, and the angle of incidence θay at the light receiving surface of the light receiving unit in the yz cross section is obtained. If the absolute value of θay is equal to or greater than the maximum angle of incidence in the yz cross section, the value of the period of the grating is selected as Λ2. If the absolute value of θay is smaller than the maximum angle of incidence in the yz cross section, Λ2 is obtained by reducing the value of the period of the grating.

In general, the pitch length is reduced by increasing the period of the grating and an easier-to-observe image can be obtained. Accordingly, the period of the grating should preferably be made as great as possible so long as the conditions of the maximum angle of incidence are satisfied. The relationship between the period of the grating and the pitch length will be described in detail in the description concerning Example 1.

Figure 8:
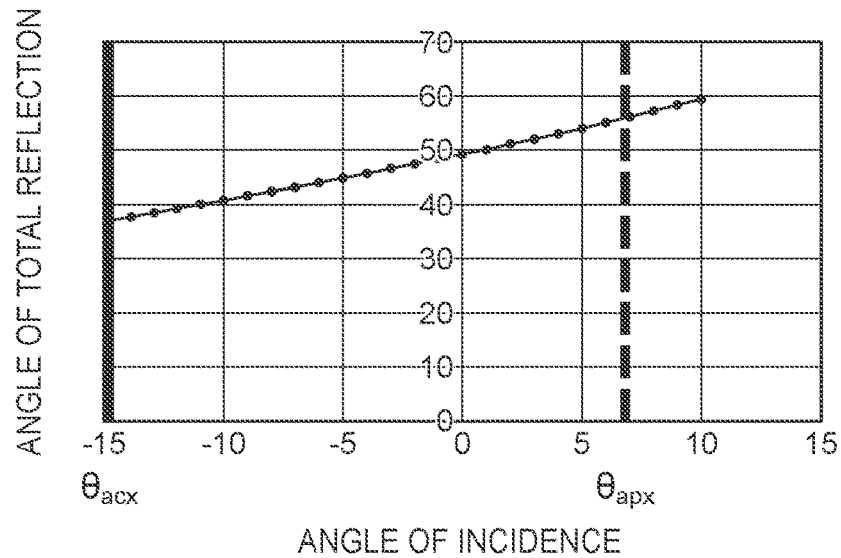
FIG. 8 shows a relationship between angle of incidence at the light receiving surface of the light receiving unit and angle of incidence inside the light guiding substrate in the xz cross section.

FIG. 8 shows a relationship between angle of incidence at the light receiving surface of the light receiving unit and angle of incidence inside the light guiding substrate in the xz cross section. FIG. 8 shows the above-described relationship of Example 1 described later. The horizontal axis of FIG. 8 indicates angle of incidence at the light receiving surface of the light receiving unit 110 in the xz cross section and the vertical axis of FIG. 8 indicates angle of total reflection inside the light guiding substrate in the xz cross section. When an angle of incidence at the light receiving surface of the light receiving unit in the xz cross section is equal to or greater than θacx, an angle of incidence inside the light guiding substrate in the xz cross section is equal to or greater than the critical angle. When an angle of incidence at the light receiving surface of the light receiving unit in the xz cross section is equal to or smaller than θapx, the pitch is smaller than the size of the pupil. θapx is the value of angle of incidence that corresponds to the angle of pitch in the xz cross section. Thus, the range of angle of incidence at the light receiving surface of the light receiving unit in the xz cross section must be determined in such a way that the angle of incidence inside the light guiding substrate in the xz cross section is equal to or greater than the critical angle and the pitch is smaller than the size of the pupil.

In step S1040 of FIG. 3 an area of the light receiving unit 110 which makes rays of light travel in such a way that the angle of incidence inside the light guiding substrate is equal to or greater than the critical angle and the pitch is smaller than the size of the pupil is obtained.

The critical angle of a ray of light in an xz cross section will be considered. In the xz cross section the value of an angle of incidence θacx at the light receiving surface is negative when an angle of incidence in the light guiding substrate is equal to the critical angle. θacx is obtained by substituting Λ1 to Λ of Expression (2).

The condition of incident angle that make an angle of incidence inside the light guiding substrate equal to or greater than the critical angle in the xz cross section is given by the following expression.

$$\tan\theta_{ax} \geq \tan\theta_{ay} \cdot \tan\alpha + \frac{\tan\theta_{acx}}{\cos\alpha} \quad (4)$$

where
θax Angle of incidence at the light receiving surface of the light receiving unit in the xz cross section
θay Angle of incidence at the light receiving surface of the light receiving unit in the yz cross section
α Angle of inclination (measured counterclockwise) of grooves of the grating from the y-axis, the grooves being nearly parallel to the y-axis The critical angle of a ray of light in an yz cross section will be considered. The value of an angle of incidence θacy at the light receiving surface is positive when an angle of incidence inside the light guiding substrate is equal to the critical angle. θacy is obtained by substituting Λ2 into Λ of the following expression obtained from Expression (1)'.

$$\sin\theta_{ay} + 1 = \frac{\lambda}{\Lambda} \quad (2)'$$

The condition of incident angle that make an angle of incidence inside the light guiding substrate in the yz cross section is given by the following expression.

$$\tan\theta_{ay} \leq -\tan\theta_{ax} \cdot \tan\beta + \frac{\tan\theta_{acy}}{\cos\beta} \quad (5)$$

where
θax Angle of incidence at the light receiving surface of the light receiving unit in the xz cross section
θay Angle of incidence at the light receiving surface of the light receiving unit in the yz cross section
β Angle of inclination (measured counterclockwise) of grooves of a grating from the x-axis, the grooves being nearly parallel to the x-axis The pitch of a ray of light in an xz cross section will be considered. The value of an angle of incidence θapx at the light receiving surface is positive when the pitch corresponds to the size of the pupil. θapx is obtained by substituting Λ1 into Λ of the following expression obtained by substituting θp into θgx of Expression (1).

$$-\sin\theta_{ax} + n_g \cdot \sin\theta_p = \frac{\lambda}{\Lambda} \quad (3)$$

The condition of incident angle that make the pitch in the light guiding substrate equal to or smaller than the size of the pupil in the xz cross section is given by the following expression.

$$\tan\theta_{ax} \leq \tan\theta_{ay} \cdot \tan\alpha + \frac{\tan\theta_{apx}}{\cos\alpha} \quad (6)$$

where
θax Angle of incidence at the light receiving surface of the light receiving unit in the xz cross section
θay Angle of incidence at the light receiving surface of the light receiving unit in the yz cross section
α Angle of inclination (measured counterclockwise) of the grooves of the grating from the y-axis, the grooves being nearly parallel to the y-axis The pitch of a ray of light in an yz cross section will be considered. The value of an angle of incidence θapy at the light receiving surface is negative when the pitch corresponds to the size of the pupil. θapy is obtained by substituting Λ2 into Λ of Expression (3)'.

The condition of incident angle that make the pitch in the light guiding substrate equal to or smaller than the size of the pupil in the yz cross section is given by the following expression.

$$\tan\theta_{ay} \geq -\tan\theta_{ax} \cdot \tan\beta + \frac{\tan\theta_{apy}}{\cos\beta} \quad (7)$$

where
θax Angle of incidence at the light receiving surface of the light receiving unit in the xz cross section
θay Angle of incidence at the light receiving surface of the light receiving unit in the yz cross section
β Angle of inclination (measured counterclockwise) of grooves of a grating from the x-axis, the grooves being nearly parallel to the x-axis Directions of rays of light delivered by the first unit and the second unit of the light receiving unit are changed approximately 90 degrees respectively by the first direction changing unit and the second direction changing unit.

According to studies in the wave vector space, the following additional condition must be satisfied in order to transmit lays of light in such a way that the angle of incidence inside the light guiding substrate is equal to or greater than the critical angle and the pitch is smaller than the size of the pupil.

The additional condition for rays of light having entered the first unit 111 is expressed by the following expression.

$$\tan\theta_{ax} \geq \tan\theta_{ay} \cdot \tan\alpha + \frac{\tan\theta'_{acx}}{\cos\alpha} \qquad (4)'$$

An angle of incidence θacx' at the light receiving surface that corresponds to the critical angle for the period of the grating of Λ2 in the xz cross section is obtained by substituting Λ2 into Λ of Expression (2).

The condition for rays of light having entered the second unit 112 is expressed by the following expression.

$$\tan\theta_{ay} \geq -\tan\theta_{ax} \cdot \tan\beta + \frac{\tan\theta'_{apy}}{\cos\beta} \qquad (7)'$$

An angle of incidence θacx' at the light receiving surface that corresponds to the pitch for the period of the grating of Λ1 in the yz cross section is obtained by substituting Λ1 into Λ of Expression (3).

Figure 9:
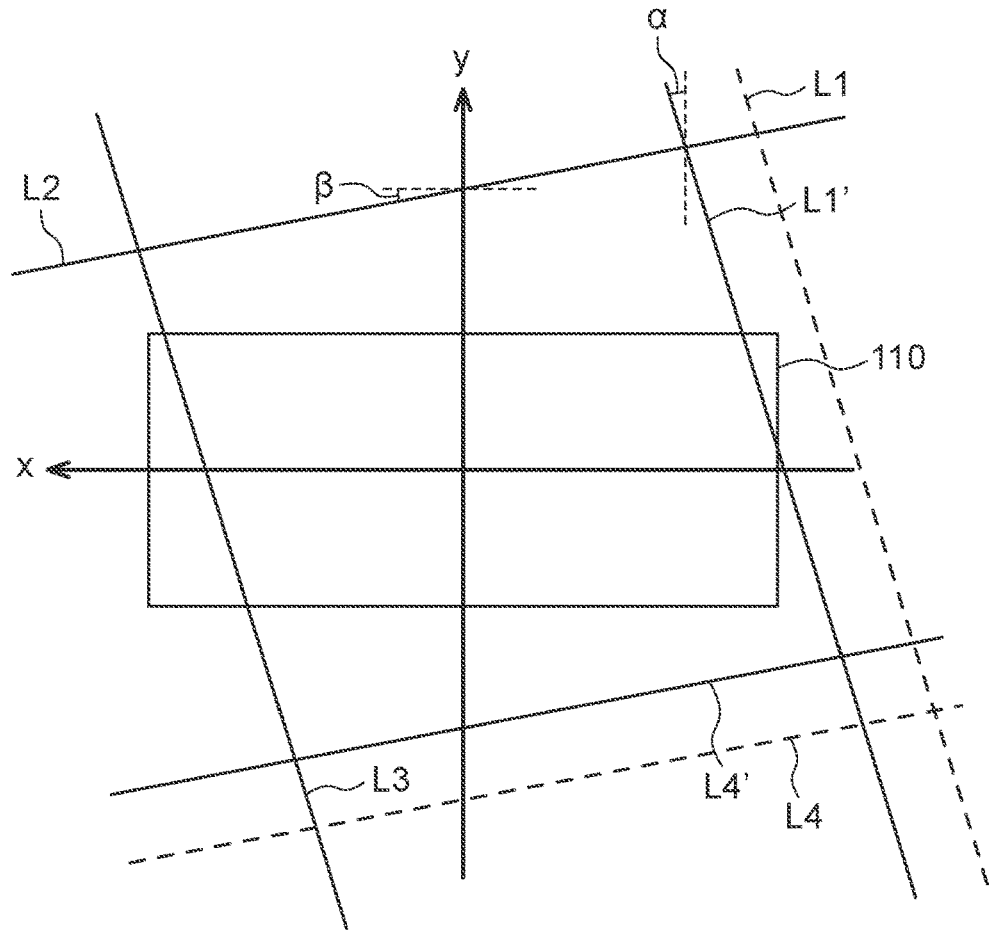
FIG. 9 shows an area of the light receiving unit that makes lays of light travel in such a way that an angle of incidence inside the light guiding substrate is equal to or greater than the critical angle and a pitch is smaller than the size of the pupil.

FIG. 9 shows an area of the light receiving unit 110 that makes lays of light travel in such a way that the angle of incidence inside the light guiding substrate is equal to or greater than the critical angle and the pitch is smaller than the size of the pupil. The x-axis in FIG. 9 indicates tan(θax) and the y-axis in FIG. 9 indicates tan(θay). L1, L2, L3 and L4 in FIG. 9 indicate respectively Expressions (4), (5), (6) and (7). Further, L1' and L4' indicate respectively Expressions (4)' and (7)'. The area surrounded by straight lines L1', L2, L3 and L4' is the area that makes lays of light travel in such a way that the angle of incidence inside the light guiding substrate is equal to or greater than the critical angle and the pitch is smaller than the size of the pupil. This area is referred to as an overlapped area.

In step S1050 of FIG. 3 dimensions of the light emitting unit 130 are determined.

The origin of the coordinate system shown in FIG. 4 is made to agree with the center of a surface of the light emitting unit 130, and the plane containing the x-axis and y-axis is made to agree with the surface of the light emitting unit 130. Further, the center of the eye box 200 is located on the z-axis and the eye box 200 is placed so as to be parallel to the plane containing the x-axis and y-axis. The angle of incidence of a ray of light that has been emitted by a point P' on the surface of the light emitting unit 130 and reaches the center of the eye box 200 is represented by θ. The x component of θ and the y component of θ are represented respectively by θx and θy.

A length in the x-axis direction L2x and a length in the y-axis direction L2y of the light emitting unit 130 are determined respectively by the following expressions.

$L2_x = 2 \cdot D' \cdot \tan\theta_{xmax} + L20_x/2$ $L2_y = 2 \cdot D' \cdot \tan\theta_{ymax} + L20_y/2$ where
- D' Distance from the center of the surface of the eye box to the origin (the center of the surface of the light emitting unit)
- L20x Length in the x-axis direction of the eye box
- L20y Length in the y-axis direction of the eye box
- θxmax Maximum value of the absolute value of θx
- θymax Maximum value of the absolute value of θy The light emitting unit 110 is a two-dimensional diffraction grating on a surface of the light guiding substrate. The period of each of the two types of diffraction gratings is equal to the period of the corresponding one of the one-dimensional diffraction gratings of the first unit 111 and the second unit 112 of the light receiving unit 110.

In step S1060 of FIG. 3 a layout of the light receiving unit 110 and the light emitting unit 130 is determined from a distance between the pupils and a positional relationship between the eye and the ear.

In step S1070 of FIG. 3 a way of dividing the light receiving unit 110 into the first unit 111 and the second unit 112 is optimized by estimating brightness of images observed by the pupil using optical simulation (for example that using Virtual Lab) while changing the way of division in consideration of the overlapped area. Further, the shapes of the first direction changing unit 121 and the second direction changing unit 122 are optimized according to the first unit 111 and the second unit 112 separated as described above.

Apparatuses in the prior art are configured such that paths of rays of light that travel from one of the first unit and the second unit to the light emitting unit do not pass through the portion of the light guiding substrate on which the other is provided. On the other hand, a light guiding apparatus according to the present invention is configured such that the center of the smallest circle that contains the first unit is farther away from the light emitting unit than the center of the smallest circle that contains the second unit, and paths of rays of light that travel from the first unit to the light emitting unit pass through the portion of the light guiding substrate on which the second unit is provided. Accordingly, in a light guiding apparatus according the present invention, a way of dividing the light receiving unit 110 into the first unit 111 and the second unit 112 can be far more flexibly determined than in light guiding apparatuses in the prior art.

Examples and a comparative example of the present invention will be described below.

Material of the light guiding substrate 150 provided with the light receiving unit 110, the first direction changing unit 121, the second direction changing unit 122 and the light emitting unit 130 is polycarbonate. Refractive index of light at the wavelength of 520 nanometers of the material is 1.6748. A thickness of the light guiding substrate 150 is 1.25 millimeters. Corresponding elements in respective examples are represented by the same reference number.

The light receiving unit 110 is rectangular, which is 3.343 millimeters long in the x-axis direction and 2.49 millimeters long in the y-axis direction. Grooves of the first unit 111 of the light receiving unit 110 are nearly parallel to the y-axis, and the period of the grating is 410 nanometers. Grooves of the second unit 112 of the light receiving unit 110 are nearly parallel to the x-axis, and the period of the grating is 460 nanometers.

The light emitting unit 130 is rectangular, which is 21.207 millimeters long in the x-axis direction and 11.929 millimeters long in the y-axis direction. In light emitting unit 130, the period of the grating parallel to the x-axis is 460 nanometers, and the period of the grating parallel to the y-axis is 460 nanometers.

The direction of grooves of a grating is represented by an angle measured clockwise with respect to the direction of the y-axis. The direction of grooves of a grating is referred to also as the direction of the grating.

A distance D between the light source 50 and the light receiving unit 110 is 6.3 millimeters, and a distance D' between the light emitting unit 130 and the eye box 200 is 18 millimeters. An angle of view in the diagonal direction of the light receiving unit 110 is 30 degrees.

The light source is a laser light source. The spot is 0.4 millimeters long in the direction of the x-axis and 0.8 millimeters long in the direction of the y-axis. The eye box 200 is 12.8 millimeters long in the x-axis direction and 7.2 millimeters long in the y-axis direction.

Example 1

Figure 10:
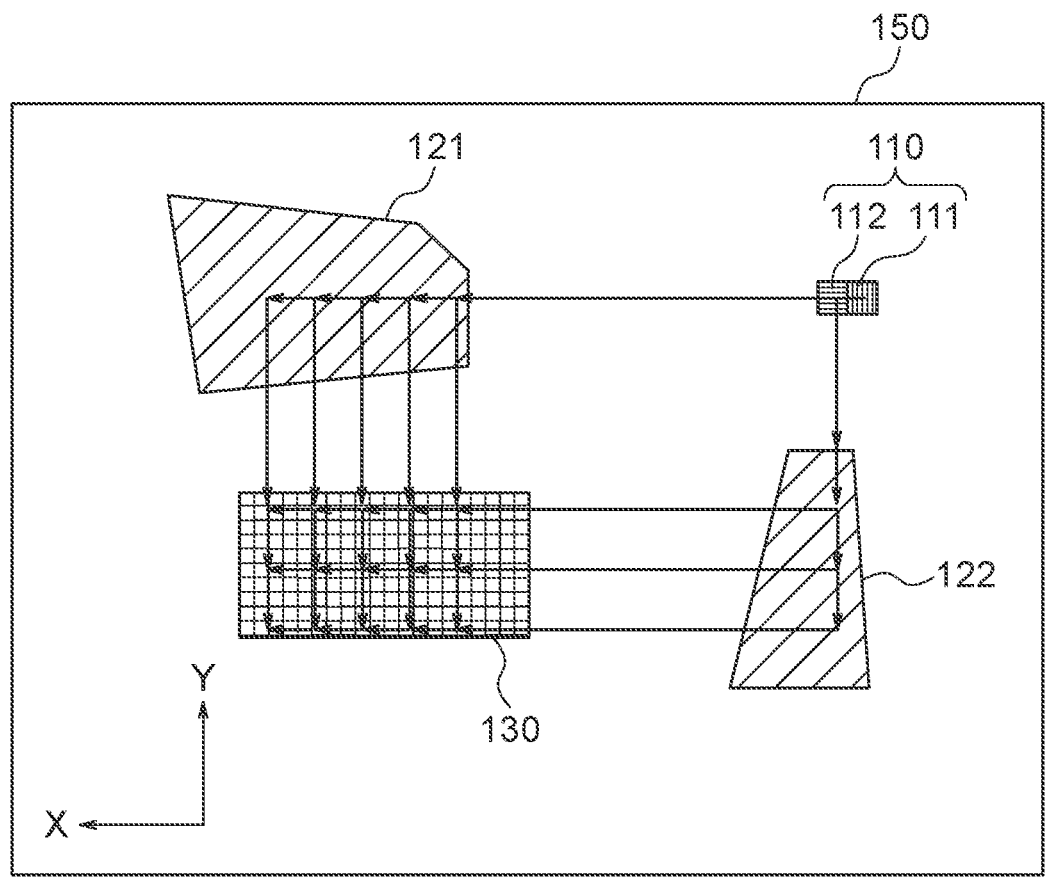
FIG. 10 shows a plan view of a light guiding apparatus according to Example 1.

FIG. 10 shows a plan view of a light guiding apparatus 100 according to Example 1.

Figure 11:
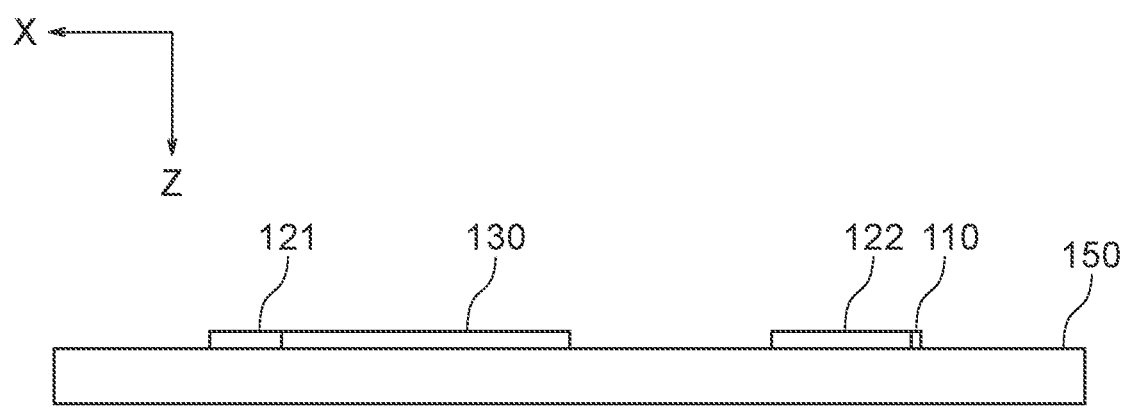
FIG. 11 shows an xz cross section of the light guiding apparatus according to Example 1.

FIG. 11 shows an xz cross section of the light guiding apparatus 100 according to Example 1.

The direction of the grating of the first unit 111 of the light receiving unit 110 is 0 degree and the period of the grating is 410 nanometers. The direction of the grating of the second unit 112 of the light receiving unit 110 is 90 degree and the period of the grating is 460 nanometers. A boundary line that passes through the center of the light receiving unit 110 and is parallel to the y-axis divides the light receiving unit 110 into the first unit 111 and the second unit 112 in such a way that the area of the first unit 111 and that of the second unit 112 are equal to each other.

The light receiving unit 110 of Example 1 is configured such that the first unit 111 is located farther away from the light emitting unit 130 than the second unit 112 and paths of rays of light that travel from the first unit 111 to the light emitting unit 130 run through the portion of the light guiding substrate 150 on which the second unit 112 is provided. More specifically, rays of light that travel from the first unit 111 to the first direction changing unit 121 travel in a direction parallel to the x-axis in such a way that x coordinate increases and pass through the portion of the light guiding substrate 150 on which the second unit 112 is provided. Rays of light that travel from the second unit 112 to the second direction changing unit 122 travel in a direction parallel to the y-axis in such a way that y coordinate decreases.

The direction of the grating of the first direction changing unit 121 is 45 degrees and the period of the grating is 290 nanometers. The direction of the grating of the second direction changing unit 122 is 45 degrees and the period of the grating is 325 nanometers.

Table 1 shows luminance on the light receiving surface of the eye box. Values of luminance are represented by the ratio (percent) to the value of luminance of the light source. The values in Table 1 and the following tables are obtained by optical simulation (using Virtual lab, for example).

As shown in FIG. 2 the light receiving surface of the eye box 200 and the light emitting surface of the light emitting unit 130 are parallel to each other and the straight line connecting the centers of both surfaces is parallel to the z-axis. Accordingly, a position on the light receiving surface of the eye box 200 can be determined by incident angle of a ray of light emitted from the center of the light emitting surface of the light emitting unit 130. Values of angle described in a row of Table 1 indicate the x component of incident angle, that is, x coordinate and values of angle described in a column of Table 1 indicate the y component of incident angle, that is, y coordinate.

In Table 2 and the following tables values of luminance and values of angle described in a row and in a column are defined similarly.

TABLE 1

| | 13° | 11° | 9° | 7° | 5° | 3° | 1° | 0° |
|---|---|---|---|---|---|---|---|---|
| 7.5° | 0.112% | 0.141% | 0.155% | 0.040% | 0.026% | 0.012% | 0.024% | 0.031% |
| 5° | 0.066% | 0.066% | 0.077% | 0.032% | 0.010% | 0.007% | 0.027% | 0.060% |
| 2.5° | 0.070% | 0.081% | 0.102% | 0.041% | 0.030% | 0.024% | 0.045% | 0.092% |
| 0° | 0.099% | 0.122% | 0.133% | 0.066% | 0.045% | 0.030% | 0.055% | 0.095% |
| −2.5° | 0.246% | 0.279% | 0.258% | 0.127% | 0.133% | 0.112% | 0.073% | 0.097% |
| −5° | 0.196% | 0.225% | 0.205% | 0.121% | 0.145% | 0.118% | 0.079% | 0.101% |
| −7.5° | 0.119% | 0.140% | 0.128% | 0.101% | 0.100% | 0.084% | 0.056% | 0.076% |

| | −1° | −3° | −5° | −7° | −9° | −11° | −13° |
|---|---|---|---|---|---|---|---|
| 7.5° | 0.068% | 0.115% | 0.108% | 0.106% | 0.120% | 0.117% | 0.135% |
| 5° | 0.086% | 0.091% | 0.089% | 0.073% | 0.106% | 0.111% | 0.148% |
| 2.5° | 0.144% | 0.157% | 0.178% | 0.132% | 0.114% | 0.088% | 0.072% |
| 0° | 0.139% | 0.144% | 0.165% | 0.126% | 0.086% | 0.062% | 0.039% |
| −2.5° | 0.114% | 0.110% | 0.144% | 0.145% | 0.089% | 0.070% | 0.037% |
| −5° | 0.141% | 0.164% | 0.217% | 0.193% | 0.146% | 0.109% | 0.078% |
| −7.5° | 0.116% | 0.131% | 0.168% | 0.151% | 0.126% | 0.061% | 0.055% |

Table 2 shows a length of pitch in the light guiding substrate 150 for rays of light with various values of angle of incidence in the light guiding apparatus 100 of Example 1. The unit of length of pitch is millimeter.

TABLE 2

| | 13 | 11 | 9 | 7 | 5 | 3 | 1 | 0 |
|---|---|---|---|---|---|---|---|---|
| 7.5 | 2.934 | 2.916 | 2.901 | 2.890 | 2.881 | 2.875 | 2.872 | 2.871 |
| 5 | 2.717 | 2.700 | 2.685 | 2.674 | 2.666 | 2.660 | 2.657 | 2.657 |
| 2.5 | 2.524 | 2.507 | 2.494 | 2.483 | 2.474 | 2.469 | 2.466 | 2.466 |
| 0 | 2.351 | 2.335 | 2.322 | 2.311 | 2.303 | 2.297 | 2.295 | 2.294 |
| −2.5 | 2.194 | 2.179 | 2.166 | 2.155 | 2.147 | 2.142 | 2.139 | 2.139 |
| −5 | 2.052 | 2.036 | 2.023 | 2.013 | 2.005 | 1.999 | 1.997 | 1.996 |
| −7.5 | 1.921 | 1.905 | 1.892 | 1.882 | 1.874 | 1.869 | 1.866 | 1.866 |

Table 3 shows a length of pitch in the light guiding substrate 150 for rays of light with various values of angle of incidence in a light guiding apparatus in which the period of the grating of the second unit 112 of the light guiding apparatus 100 of Example 1 has been changed from 460 nanometers to 410 nanometers. The unit of length of pitch is millimeter.

TABLE 3

|  | 13 | 11 | 9 | 7 | 5 | 3 | 1 | 0 |
|---|---|---|---|---|---|---|---|---|
| 7.5 | 3.896 | 3.874 | 3.856 | 3.841 | 3.830 | 3.823 | 3.819 | 3.819 |
| 5 | 3.533 | 3.513 | 3.496 | 3.483 | 3.473 | 3.466 | 3.463 | 3.462 |
| 2.5 | 3.231 | 3.212 | 3.196 | 3.184 | 3.174 | 3.168 | 3.165 | 3.165 |
| 0 | 2.973 | 2.956 | 2.941 | 2.929 | 2.920 | 2.914 | 2.911 | 2.911 |
| −2.5 | 2.750 | 2.733 | 2.719 | 2.708 | 2.699 | 2.693 | 2.690 | 2.690 |

TABLE 3-continued

|  | 13 | 11 | 9 | 7 | 5 | 3 | 1 | 0 |
|---|---|---|---|---|---|---|---|---|
| −5 | 2.554 | 2.537 | 2.523 | 2.512 | 2.504 | 2.499 | 2.496 | 2.495 |
| −7.5 | 2.379 | 2.363 | 2.349 | 2.338 | 2.330 | 2.325 | 2.322 | 2.322 |

Values of length of pitch in Table 3 for the period of the grating of 410 nanometers are greater than those in Table 2 for the period of the grating of 46 nanometers. Thus, a length of pitch increases by reducing the period of the grating.

Comparative Example

Figure 12:
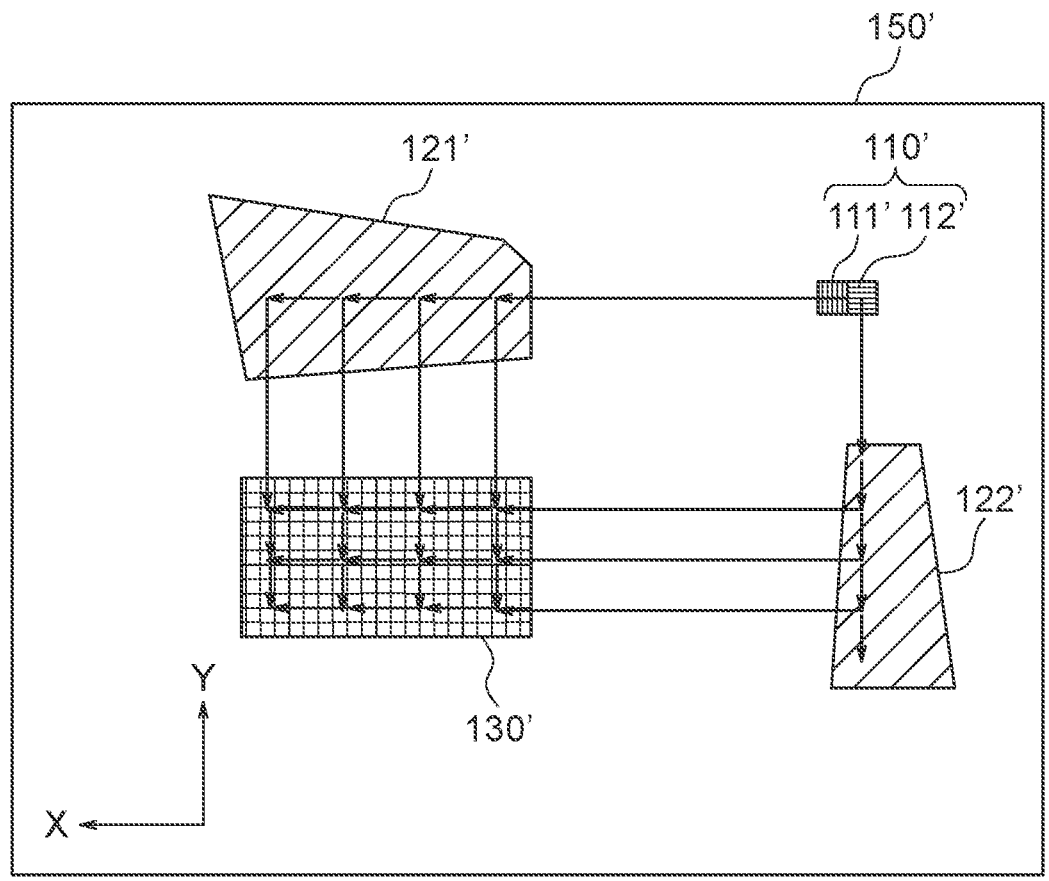
FIG. 12 shows a plan view of a light guiding apparatus 100' according to Comparative Example.

FIG. 12 shows a plan view of a light guiding apparatus 100' according to Comparative Example.

Figure 13:
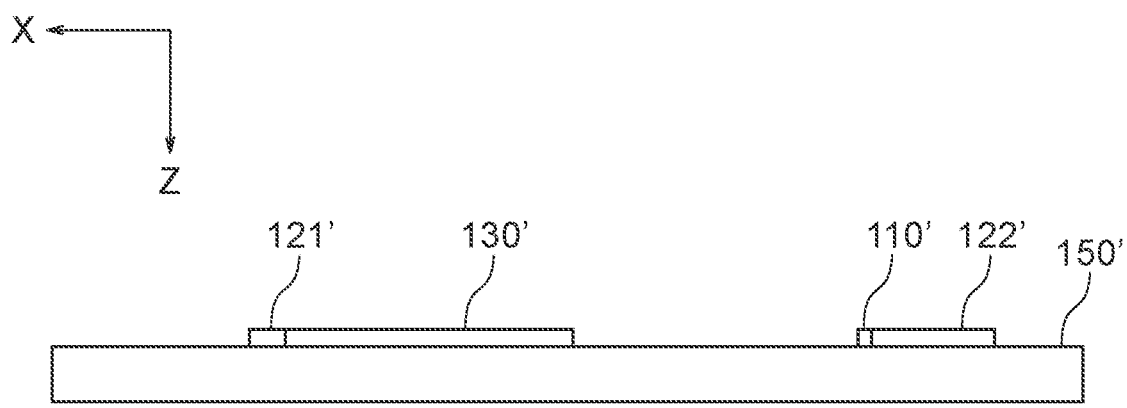
FIG. 13 shows an xz cross section of the light guiding apparatus according to Comparative Example.

FIG. 13 shows an xz cross section of the light guiding apparatus 100' according to Comparative Example.

The direction of the grating of a first unit 111' of a light receiving unit 110' is 0 degree and the period of the grating is 410 nanometers. The direction of the grating of a second unit 112' of the light receiving unit 110' is 90 degree and the period of the grating is 460 nanometers. A boundary line that passes through the center of the light receiving unit 110' and is parallel to the y-axis divides the light receiving unit 110' into the first unit 111' and the second unit 112' in such a way that the area of the first unit 111' and that of the second unit 112' are equal to each other.

In Comparative Example the first unit and the second unit are located such that paths of rays of light that travel from one of both do not run through the portion of a light guiding substrate 150' on which the other is provided. More specifically, rays of light that travel from the first unit 111' to a first direction changing unit 121' travel in a direction parallel to the x-axis in such a way that the x coordinate increases, and rays of light that travel from the second unit 112' to a second direction changing unit 122' travel in a direction parallel to the y-axis in such a way that the y coordinate decreases. Thus, rays of light that travel from one of both do not pass through the portion of the light guiding substrate 150' on which the other is provided.

The direction of the grating of the first direction changing unit 121' is 45 degrees and the period of the grating is 325 nanometers. The direction of the grating of the second direction changing unit 122' is 45 degrees and the period of the grating is 290 nanometers.

Table 4 shows luminance on the light receiving surface of the eye box.

TABLE 4

|  | 13° | 11° | 9° | 7° | 5° | 3° | 1° | 0° |
|---|---|---|---|---|---|---|---|---|
| 7.5° | 0.029% | 0.043% | 0.049% | 0.045% | 0.055% | 0.079% | 0.117% | 0.081% |
| 5° | 0.041% | 0.049% | 0.064% | 0.088% | 0.066% | 0.101% | 0.107% | 0.107% |
| 2.5° | 0.051% | 0.079% | 0.114% | 0.164% | 0.137% | 0.205% | 0.208% | 0.101% |
| 0° | 0.051% | 0.071% | 0.118% | 0.170% | 0.143% | 0.204% | 0.198% | 0.120% |
| −2.5° | 0.089% | 0.132% | 0.201% | 0.286% | 0.339% | 0.446% | 0.394% | 0.227% |
| −5° | 0.146% | 0.208% | 0.287% | 0.413% | 0.307% | 0.364% | 0.296% | 0.089% |
| −7.5° | 0.143% | 0.194% | 0.236% | 0.338% | 0.273% | 0.319% | 0.224% | 0.074% |

|  | −1° | −3° | −5° | −7° | −9° | −11° | −13° |
|---|---|---|---|---|---|---|---|
| 7.5° | 0.085% | 0.059% | 0.037% | 0.025% | 0.028% | 0.026% | 0.021% |
| 5° | 0.090% | 0.050% | 0.032% | 0.017% | 0.018% | 0.014% | 0.014% |
| 2.5° | 0.057% | 0.035% | 0.023% | 0.013% | 0.010% | 0.009% | 0.008% |
| 0° | 0.060% | 0.016% | 0.012% | 0.005% | 0.002% | 0.002% | 0.001% |
| −2.5° | 0.090% | 0.007% | 0.006% | 0.003% | 0.001% | 0.001% |  |
| −5° | 0.037% | 0.003% | 0.002% | 0.001% |  |  |  |
| −7.5° | 0.029% | 0.002% |  |  |  |  |  |

Example 2

Figure 14:
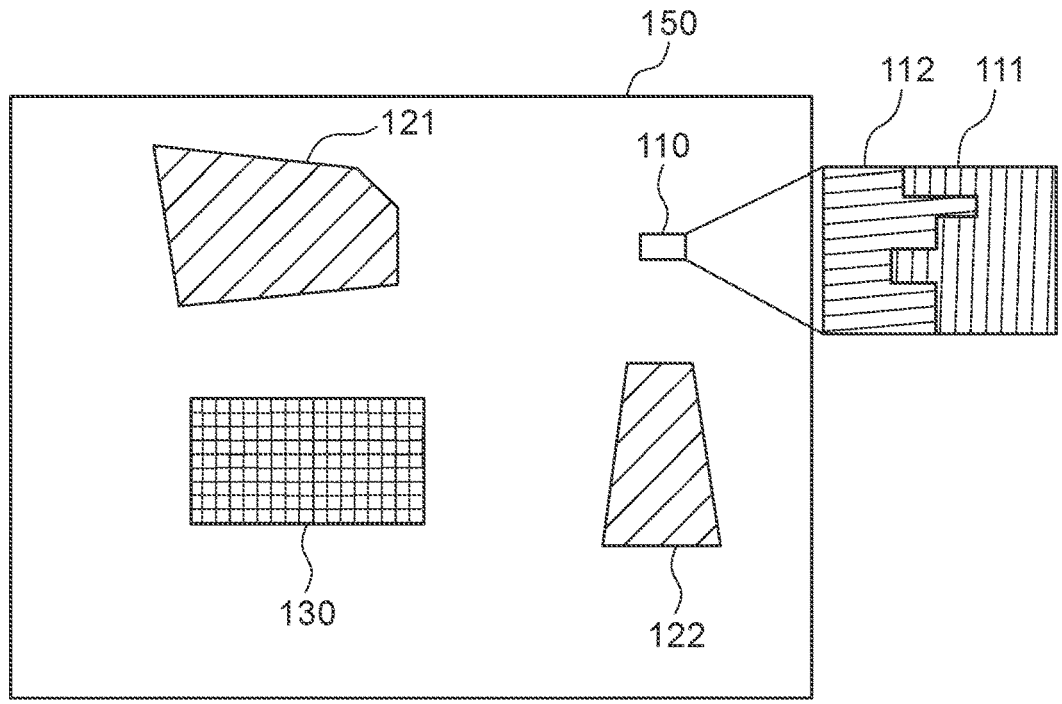
FIG. 14 shows a plan view of a light guiding apparatus according to Example 2.

FIG. 14 shows a plan view of a light guiding apparatus 100 according to Example 2.

The direction of the grating of the first unit 111 of the light receiving unit 110 is 2 degree and the period of the grating is 410 nanometers. The direction of the grating of the second unit 112 of the light receiving unit 110 is 85 degree and the period of the grating is 460 nanometers.

The light receiving unit 110 of Example 2 is configured such that the first unit 111 is located farther away from the light emitting unit 130 than the second unit 112 and paths of rays of light that travel from the first unit 111 to the light emitting unit 130 run through the portion of the light guiding substrate 150 on which the second unit 112 is provided.

Figure 15:
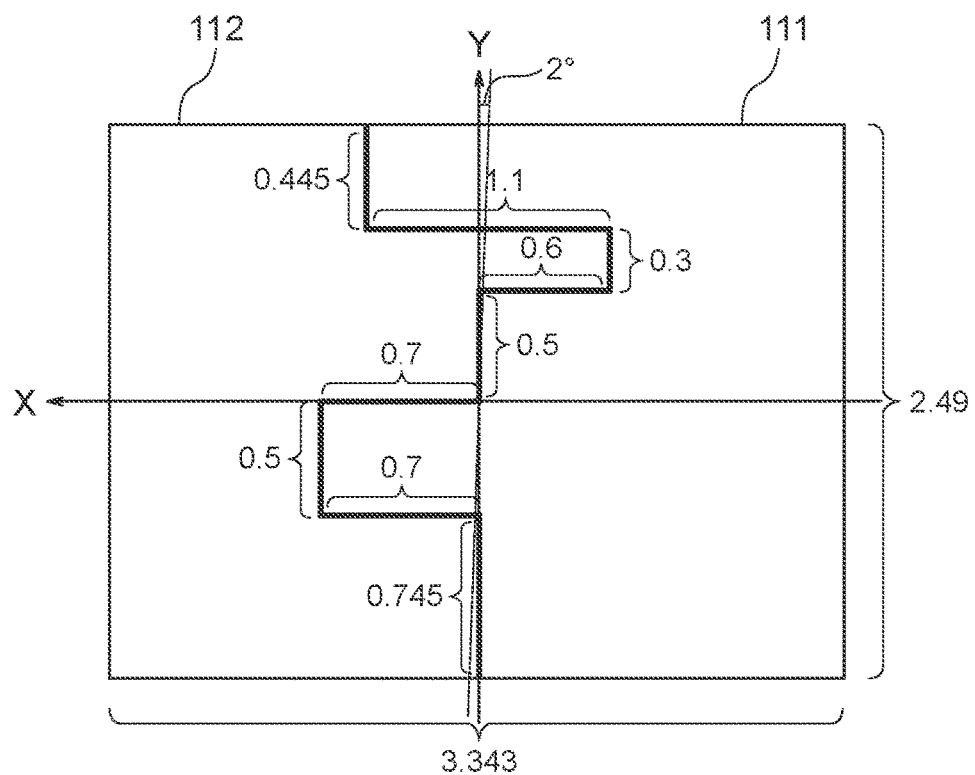
FIG. 15 shows a plan view of the light receiving unit of Example 2.

FIG. 15 shows a plan view of the light receiving unit 110 of Example 2. The border line between the first unit 111 and the second unit 112 includes 4 line segments parallel to the x-axis and 5 line segments parallel to the y-axis.

For example, the straight line that passes through the origin of the coordinate system, that is, the center of the light receiving unit 110 and is parallel to grooves of the diffraction grating of the first unit 111 has four points of intersection with the border line.

All of the line segments of the border line between the first unit 111 and the second unit 112 are not parallel to one another and the maximum value of difference in angle of line segments or tangential lines of the border line with respect to a reference direction is 90 degrees.

In the area of the light receiving unit 110 that is located farther away from the light emitting unit 130 than the straight line that passes through the origin of the coordinate system, that is, the center of the light receiving unit 110 and is parallel to grooves of the diffraction grating of the first unit 111, the second unit 112 occupies 4.76%.

In the area of the light receiving unit 110 that is located closer to the light emitting unit 130 than the straight line that passes through the origin of the coordinate system, that is, the center of the light receiving unit 110 and is parallel to grooves of the diffraction grating of the first unit 111, the first unit 111 occupies 13.72%.

The direction of the grating of the first direction changing unit 121 is 46 degrees and the period of the grating is 285 nanometers. The direction of the grating of the second direction changing unit 122 is 42.5 degrees and the period of the grating is 310 nanometers.

Table 5 shows luminance on the light receiving surface of the eye box.

All of the line segments of the border line between the first unit 111 and the second unit 112 are not parallel to one another and the maximum value of difference in angle of line segments or tangential lines of the border line with respect to a reference direction is 90 degrees.

In the area of the light receiving unit 110 that is located farther away from the light emitting unit 130 than the straight line that passes through the origin of the coordinate system, that is, the center of the light receiving unit 110 and

TABLE 5

|  | 13° | 11° | 9° | 7° | 5° | 3° | 1° | 0° |
|---|---|---|---|---|---|---|---|---|
| 7.5° | 0.137% | 0.118% | 0.072% | 0.031% | 0.024% | 0.035% | 0.044% | 0.037% |
| 5° | 0.109% | 0.131% | 0.119% | 0.027% | 0.022% | 0.024% | 0.038% | 0.042% |
| 2.5° | 0.135% | 0.150% | 0.145% | 0.036% | 0.025% | 0.023% | 0.038% | 0.059% |
| 0° | 0.099% | 0.122% | 0.133% | 0.066% | 0.045% | 0.030% | 0.055% | 0.095% |
| −2.5° | 0.174% | 0.205% | 0.225% | 0.082% | 0.086% | 0.086% | 0.095% | 0.112% |
| −5° | 0.216% | 0.252% | 0.279% | 0.141% | 0.108% | 0.103% | 0.092% | 0.104% |
| −7.5° | 0.128% | 0.154% | 0.175% | 0.114% | 0.102% | 0.093% | 0.067% | 0.070% |

|  | −1° | −3° | −5° | −7° | −9° | −11° | −13° |
|---|---|---|---|---|---|---|---|
| 7.5° | 0.029% | 0.052% | 0.063% | 0.066% | 0.116% | 0.100% | 0.107% |
| 5° | 0.040% | 0.055% | 0.060% | 0.046% | 0.072% | 0.066% | 0.069% |
| 2.50° | 0.062% | 0.091% | 0.121% | 0.081% | 0.071% | 0.065% | 0.077% |
| 0° | 0.139% | 0.144% | 0.165% | 0.126% | 0.086% | 0.062% | 0.039% |
| −2.5° | 0.115% | 0.132% | 0.146% | 0.127% | 0.073% | 0.052% | 0.025% |
| −5° | 0.115% | 0.146% | 0.189% | 0.177% | 0.108% | 0.094% | 0.064% |
| −7.5° | 0.089% | 0.118% | 0.144% | 0.128% | 0.106% | 0.074% | 0.063% |

Example 3

Figure 16:
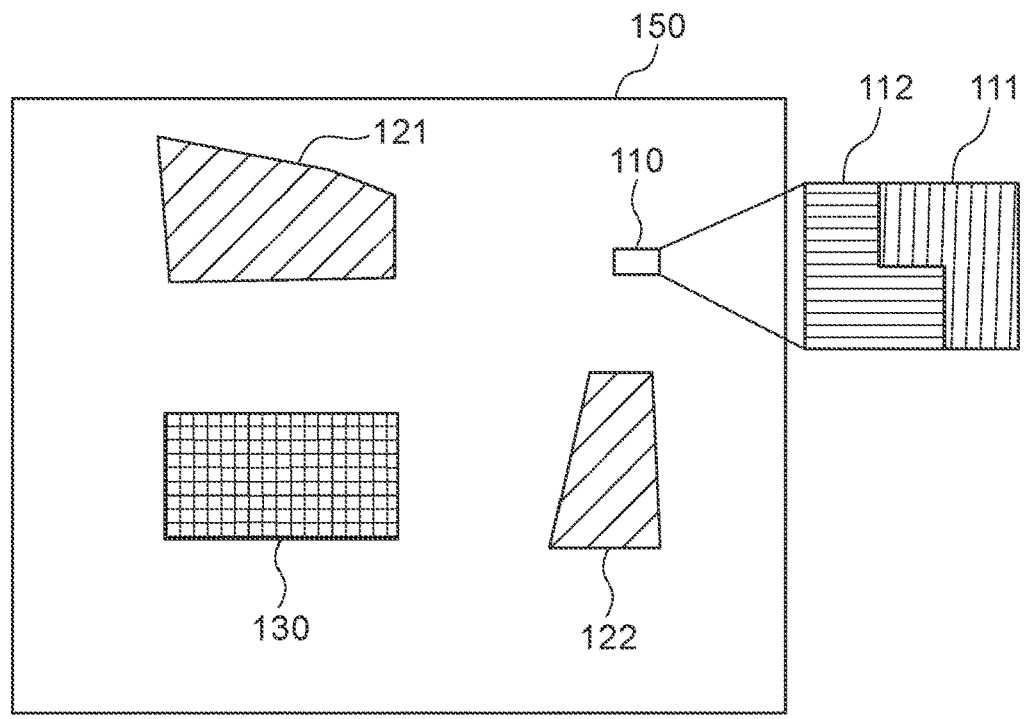
FIG. 16 shows a plan view of a light guiding apparatus according to Example 3.

FIG. 16 shows a plan view of a light guiding apparatus 100 according to Example 3.

The direction of the grating of the first unit 111 of the light receiving unit 110 is 5 degree and the period of the grating is 410 nanometers. The direction of the grating of the second unit 112 of the light receiving unit 110 is 90 degree and the period of the grating is 460 nanometers.

The light receiving unit 110 of Example 3 is configured such that the first unit 111 is located farther away from the light emitting unit 130 than the second unit 112 and paths of rays of light that travel from the first unit 111 to the light emitting unit 130 run through the portion of the light guiding substrate 150 on which the second unit 112 is provided.

Figure 17:
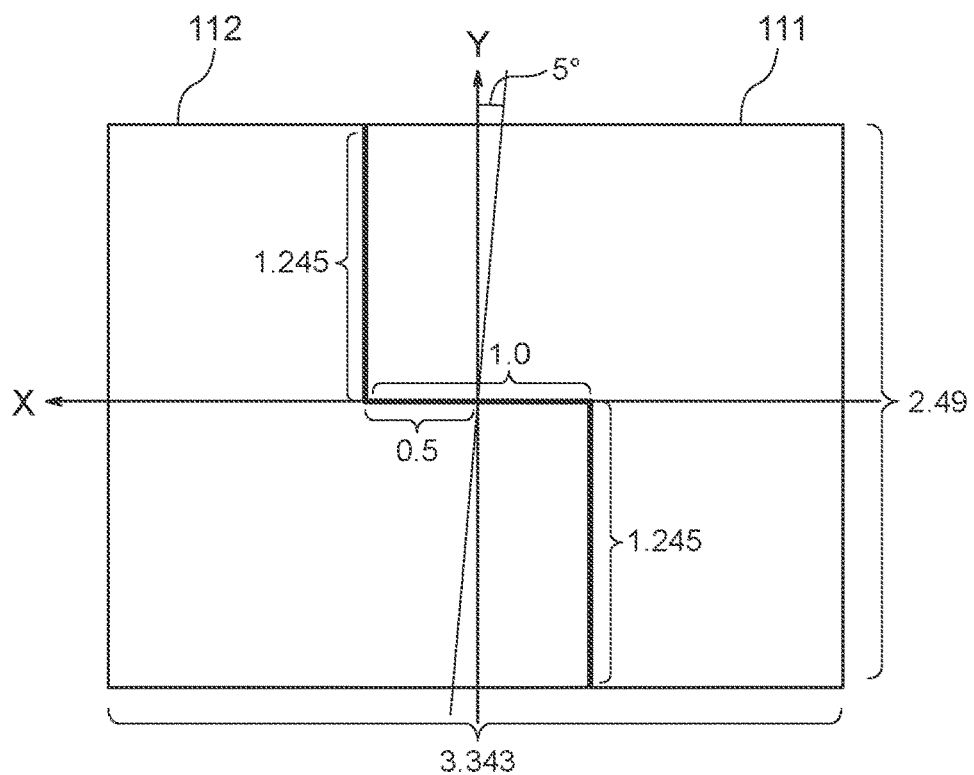
FIG. 17 shows a plan view of the light receiving unit of Example 3.

FIG. 17 shows a plan view of the light receiving unit 110 of Example 3. The border line between the first unit 111 and the second unit 112 includes 1 line segment parallel to the x-axis and 2 line segments parallel to the y-axis.

is parallel to grooves of the diffraction grating of the first unit 111, the second unit 112 occupies 18.21%.

In the area of the light receiving unit 110 that is located closer to the light emitting unit 130 than the straight line that passes through the origin of the coordinate system, that is, the center of the light receiving unit 110 and is parallel to grooves of the diffraction grating of the first unit 111, the first unit 111 occupies 18.21%.

The direction of the grating of the first direction changing unit 121 is 47.5 degrees and the period of the grating is 286 nanometers. The direction of the grating of the second direction changing unit 122 is 45 degrees and the period of the grating is 325 nanometers.

Table 6 shows luminance on the light receiving surface of the eye box.

TABLE 6

|  | 13° | 11° | 9° | 7° | 5° | 3° | 1° | 0° |
|---|---|---|---|---|---|---|---|---|
| 7.5° | 0.112% | 0.141% | 0.155% | 0.035% | 0.031% | 0.041% | 0.036% | 0.072% |
| 5° | 0.066% | 0.066% | 0.077% | 0.030% | 0.027% | 0.074% | 0.067% | 0.058% |
| 2.5° | 0.070% | 0.081% | 0.102% | 0.041% | 0.047% | 0.102% | 0.106% | 0.100% |
| 0° | 0.099% | 0.122% | 0.133% | 0.066% | 0.048% | 0.053% | 0.070% | 0.073% |
| −2.5° | 0.246% | 0.279% | 0.258% | 0.127% | 0.133% | 0.112% | 0.073% | 0.082% |
| −5° | 0.196% | 0.225% | 0.205% | 0.121% | 0.145% | 0.118% | 0.069% | 0.060% |
| −7.5° | 0.119% | 0.140% | 0.128% | 0.101% | 0.100% | 0.084% | 0.047% | 0.034% |

|  | −1° | −3° | −5° | −7° | −9° | −11° | −13° |
|---|---|---|---|---|---|---|---|
| 7.5° | 0.043% | 0.053% | 0.041% | 0.045% | 0.040% | 0.054% | 0.044% |
| 5° | 0.072% | 0.071% | 0.057% | 0.048% | 0.037% | 0.048% | 0.029% |
| 2.5° | 0.126% | 0.138% | 0.099% | 0.072% | 0.048% | 0.049% | 0.027% |
| 0° | 0.078% | 0.086% | 0.119% | 0.107% | 0.066% | 0.068% | 0.035% |
| −2.5° | 0.060% | 0.031% | 0.086% | 0.086% | 0.068% | 0.053% | 0.028% |
| −5° | 0.046% | 0.022% | 0.144% | 0.162% | 0.147% | 0.104% | 0.071% |
| −7.5° | 0.030% | 0.015% | 0.119% | 0.136% | 0.141% | 0.095% | 0.074% |

Example 4

Figure 18:
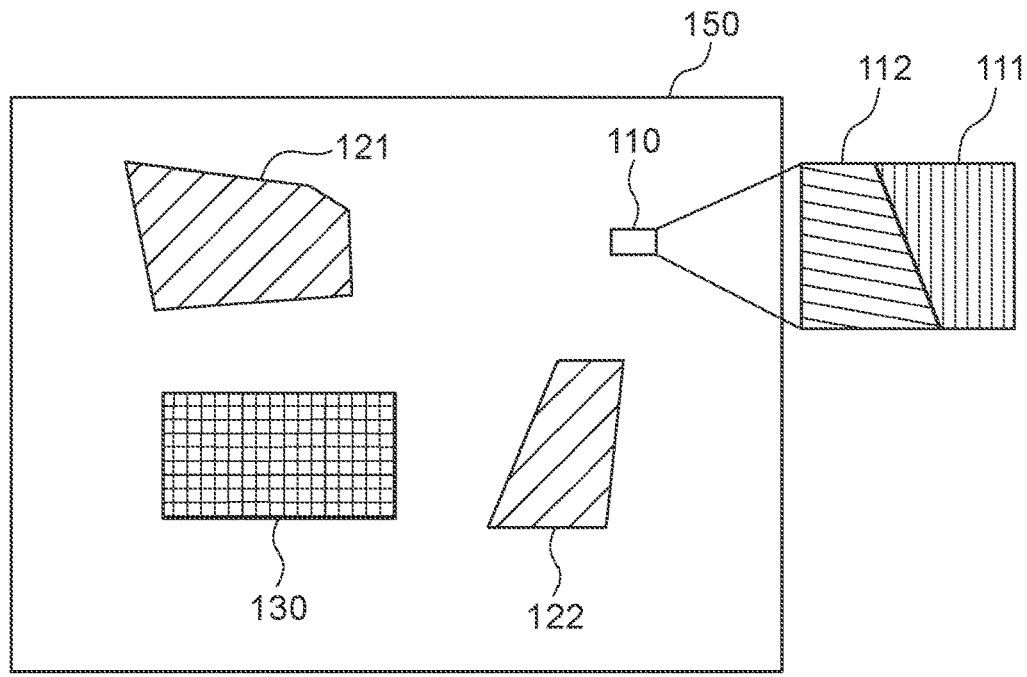
FIG. 18 shows a plan view of a light guiding apparatus according to Example 4.

FIG. 18 shows a plan view of a light guiding apparatus 100 according to Example 4.

The direction of the grating of the first unit 111 of the light receiving unit 110 is 0 degree and the period of the grating is 410 nanometers. The direction of the grating of the second unit 112 of the light receiving unit 110 is 100 degree and the period of the grating is 460 nanometers.

The light receiving unit 110 of Example 4 is configured such that the first unit 111 is located farther away from the light emitting unit 130 than the second unit 112 and paths of rays of light that travel from the first unit 111 to the light emitting unit 130 run through the portion of the light guiding substrate 150 on which the second unit 112 is provided.

Figure 19:
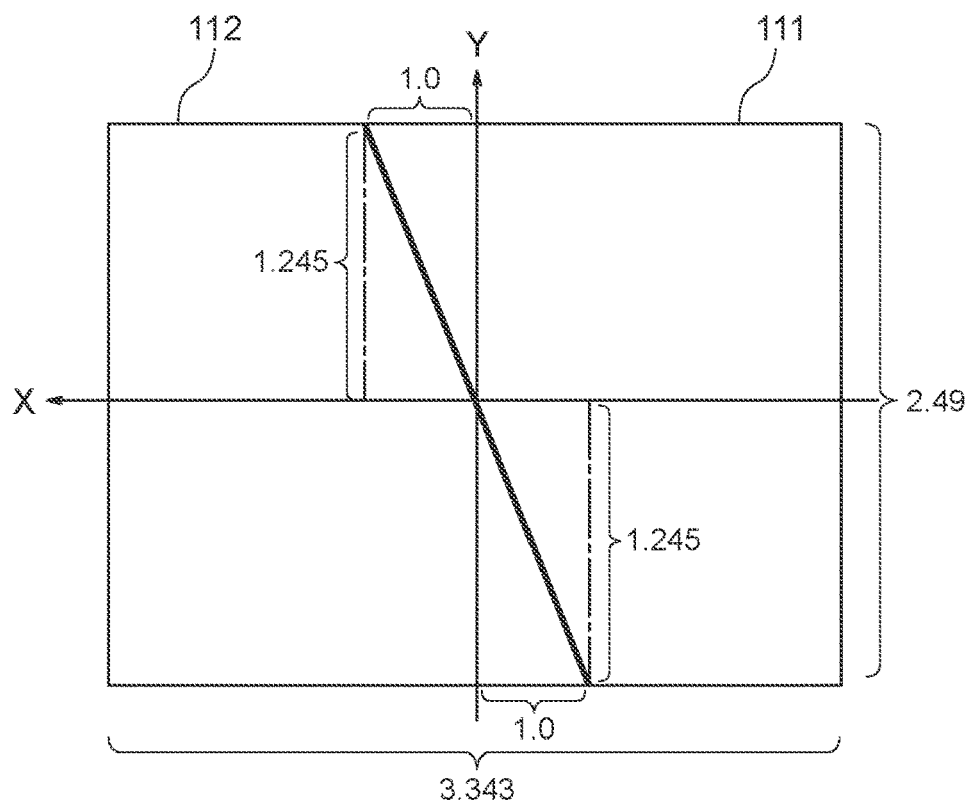
FIG. 19 shows a plan view of the light receiving unit of Example 4.

FIG. 19 shows a plan view of the light receiving unit 110 of Example 4. The border line between the first unit 111 and the second unit 112 is a line segment that is at an angle with respect to the y-axis.

In the area of the light receiving unit 110 that is located farther away from the light emitting unit 130 than the straight line that passes through the origin of the coordinate system, that is, the center of the light receiving unit 110 and is parallel to grooves of the diffraction grating of the first unit 111, the second unit 112 occupies 14.96%.

In the area of the light receiving unit 110 that is located closer to the light emitting unit 130 than the straight line that passes through the origin of the coordinate system, that is, the center of the light receiving unit 110 and is parallel to grooves of the diffraction grating of the first unit 111, the first unit 111 occupies 14.96%.

The direction of the grating of the first direction changing unit 121 is 45 degrees and the period of the grating is 290 nanometers. The direction of the grating of the second direction changing unit 122 is 50 degrees and the period of the grating is 360 nanometers.

Table 7 shows luminance on the light receiving surface of the eye box.

The direction of the grating of the first unit 111 of the light receiving unit 110 is 2 degree and the period of the grating is 410 nanometers. The direction of the grating of the second unit 112 of the light receiving unit 110 is 85 degree and the period of the grating is 460 nanometers.

The light receiving unit 110 of Example 5 is configured such that the first unit 111 is located farther away from the light emitting unit 130 than the second unit 112 and paths of rays of light that travel from the first unit 111 to the light emitting unit 130 run through the portion of the light guiding substrate 150 on which the second unit 112 is provided.

Figure 21:
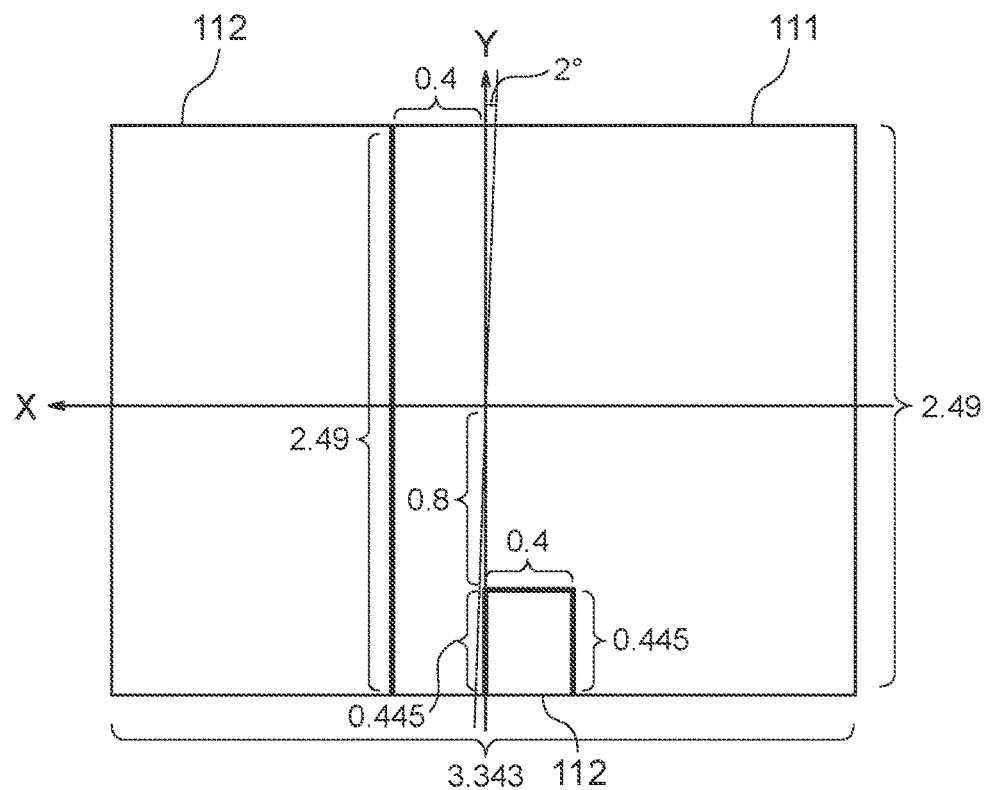
FIG. 21 shows a plan view of the light receiving unit of Example 5.

FIG. 21 shows a plan view of the light receiving unit 110 of Example 5. The border line between the first unit 111 and the second unit 112 includes 1 line segment parallel to the x-axis and 3 line segments parallel to the y-axis.

All of the line segments of the border line between the first unit 111 and the second unit 112 are not parallel to one another and the maximum value of difference in angle of line segments or tangential lines of the border line with respect to a reference direction is 90 degrees.

In the area of the light receiving unit 110 that is located farther away from the light emitting unit 130 than the straight line that passes through the origin of the coordinate system, that is, the center of the light receiving unit 110 and is parallel to grooves of the diffraction grating of the first unit 111, the second unit 112 occupies 4.28%.

In the area of the light receiving unit 110 that is located closer to the light emitting unit 130 than the straight line that passes through the origin of the coordinate system, that is, the center of the light receiving unit 110 and is parallel to grooves of the diffraction grating of the first unit 111, the first unit 111 occupies 23.93%.

The second unit 112 has two portions that are separated from each other by the first unit 111.

The direction of the grating of the first direction changing unit 121 is 46 degrees and the period of the grating is 285 nanometers. The direction of the grating of the second

TABLE 7

|  | 13° | 11° | 9° | 7° | 5° | 3° | 1° | 0° |
|---|---|---|---|---|---|---|---|---|
| 7.5° | 0.137% | 0.118% | 0.072% | 0.031% | 0.022% | 0.038% | 0.059% | 0.065% |
| 5° | 0.109% | 0.131% | 0.119% | 0.027% | 0.023% | 0.057% | 0.101% | 0.111% |
| 2.5° | 0.135% | 0.150% | 0.145% | 0.036% | 0.026% | 0.049% | 0.080% | 0.120% |
| 0° | 0.118% | 0.142% | 0.160% | 0.060% | 0.049% | 0.071% | 0.085% | 0.136% |
| −2.5° | 0.174% | 0.205% | 0.225% | 0.089% | 0.109% | 0.094% | 0.105% | 0.156% |
| −5° | 0.216% | 0.252% | 0.279% | 0.152% | 0.136% | 0.089% | 0.101% | 0.135% |
| −7.5° | 0.128% | 0.154% | 0.175% | 0.114% | 0.102% | 0.069% | 0.081% | 0.085% |

|  | −1° | −3° | −5° | −7° | −9° | −11° | −13° |
|---|---|---|---|---|---|---|---|
| 7.5° | 0.048% | 0.079% | 0.094% | 0.070% | 0.106% | 0.097% | 0.108% |
| 5° | 0.068% | 0.086% | 0.083% | 0.045% | 0.086% | 0.063% | 0.071% |
| 2.5° | 0.104% | 0.150% | 0.136% | 0.088% | 0.087% | 0.063% | 0.065% |
| 0° | 0.110% | 0.145% | 0.142% | 0.096% | 0.078% | 0.050% | 0.036% |
| −2.5° | 0.130% | 0.154% | 0.153% | 0.131% | 0.083% | 0.064% | 0.037% |
| −5° | 0.124% | 0.151% | 0.189% | 0.184% | 0.129% | 0.110% | 0.078% |
| −7.5° | 0.066% | 0.083% | 0.138% | 0.138% | 0.123% | 0.085% | 0.069% |

Example 5

Figure 20:
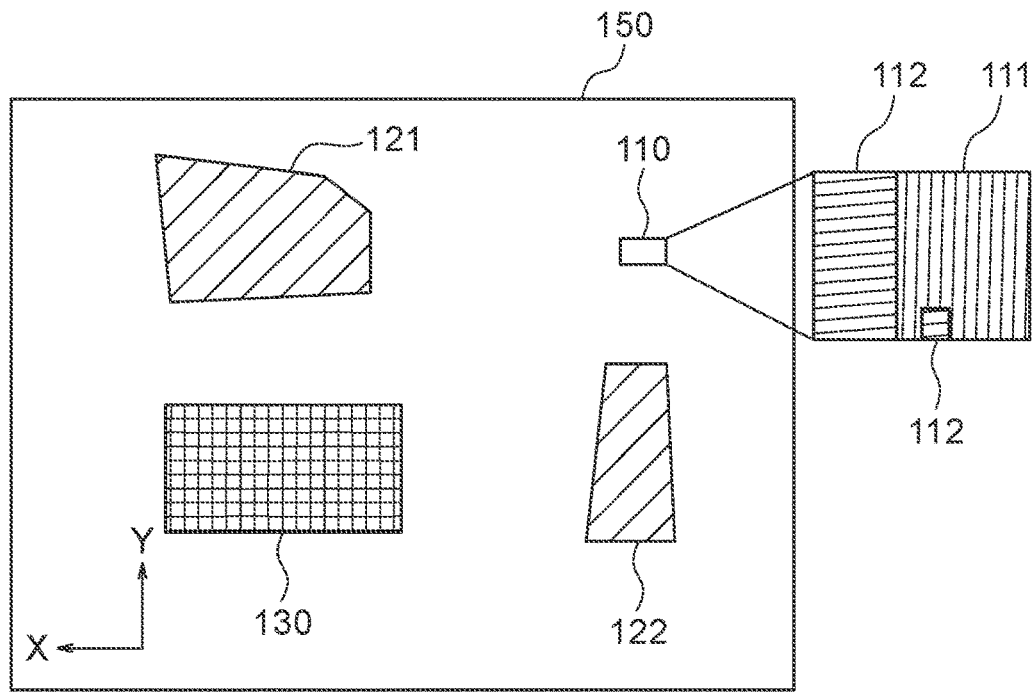
FIG. 20 shows a plan view of a light guiding apparatus according to Example 5'.

FIG. 20 shows a plan view of a light guiding apparatus 100 according to Example 5.

direction changing unit 122 is 42.5 degrees and the period of the grating is 310 nanometers.

Table 8 shows luminance on the light receiving surface of the eye box.

TABLE 8

|  | 13° | 11° | 9° | 7° | 5° | 3° | 1° | 0° |
|---|---|---|---|---|---|---|---|---|
| 7.5° | 0.137% | 0.118% | 0.072% | 0.031% | 0.022% | 0.038% | 0.059% | 0.065% |
| 5° | 0.109% | 0.131% | 0.119% | 0.027% | 0.023% | 0.057% | 0.101% | 0.111% |

TABLE 8-continued

| | | | | | | | |
|---|---|---|---|---|---|---|---|
| 2.5° | 0.135% | 0.150% | 0.145% | 0.036% | 0.026% | 0.049% | 0.080% | 0.120% |
| 0° | 0.118% | 0.142% | 0.160% | 0.060% | 0.049% | 0.071% | 0.085% | 0.136% |
| −2.5° | 0.174% | 0.205% | 0.225% | 0.089% | 0.109% | 0.094% | 0.105% | 0.156% |
| −5° | 0.216% | 0.252% | 0.279% | 0.152% | 0.136% | 0.089% | 0.101% | 0.135% |
| −7.5° | 0.128% | 0.154% | 0.175% | 0.114% | 0.102% | 0.069% | 0.081% | 0.085% |

| | −1° | −3° | −5° | −7° | −9° | −11° | −13° |
|---|---|---|---|---|---|---|---|
| 7.5° | 0.048% | 0.079% | 0.094% | 0.070% | 0.106% | 0.097% | 0.108% |
| 5° | 0.068% | 0.086% | 0.083% | 0.045% | 0.086% | 0.063% | 0.071% |
| 2.5° | 0.104% | 0.150% | 0.136% | 0.088% | 0.087% | 0.063% | 0.065% |
| 0° | 0.110% | 0.145% | 0.142% | 0.096% | 0.078% | 0.050% | 0.036% |
| −2.5° | 0.130% | 0.154% | 0.153% | 0.131% | 0.083% | 0.064% | 0.037% |
| −5° | 0.124% | 0.151% | 0.189% | 0.184% | 0.129% | 0.110% | 0.078% |
| −7.5° | 0.066% | 0.083% | 0.138% | 0.138% | 0.123% | 0.085% | 0.069% |

Evaluations of Performance of the Examples

Performance of the examples and Comparative Example will be evaluated using Tables 1 and 4-8 that show luminance on the light receiving surface of the eye box. First, Table 1 of Example 1 and Table 4 of Comparative Example will be compared with each other. Letting a threshold of observable luminance is 0.001%, all values in Table 1 are equal to or greater than the threshold. On the other hand, in Table 4 values of 9 cells that are blacked out are less than the threshold. Accordingly, the luminance efficiency of the apparatus of Example 1 is higher than that of Comparative Example. The reason is that diffraction efficiency of the paths of rays of light in Example 1 is higher than that of the paths of rays of light in Comparative Example.

Secondly, the minimum values in Table 1 and Tables 5-8 that show luminance of Examples 1-5 are given below.

Example 1 (Table 1) 0.007%
Example 2 (Table 5) 0.022%
Example 3 (Table 6) 0.015%
Example 4 (Table 7) 0.027%
Example 5 (Table 8) 0.022%

In each of Examples 2-5, by appropriately defining the boundary line between the first unit 111 and the second unit 112 of the light receiving unit 110, the minimum value of luminance of each of Examples 2-5 is remarkably greater than the minimum value of luminance of Example 1 in which the boundary line that passes through the center of the light receiving unit 110 and is parallel to the y-axis divides the light receiving unit 110 into the first unit 111 and the second unit 112 in such a way that the area of the first unit 111 and that of the second unit 112 are equal to each other. The reason is that in each of Examples 2-5 luminance of the light receiving surface of the eye box can be increased and unevenness in luminance across the light receiving surface of the eye box can be reduced by flexibly changing a layout of the first unit 111 and that of the second unit 112.

Start Light Prevention Mechanism

A stary light prevention mechanism will be described below.

Figure 22:
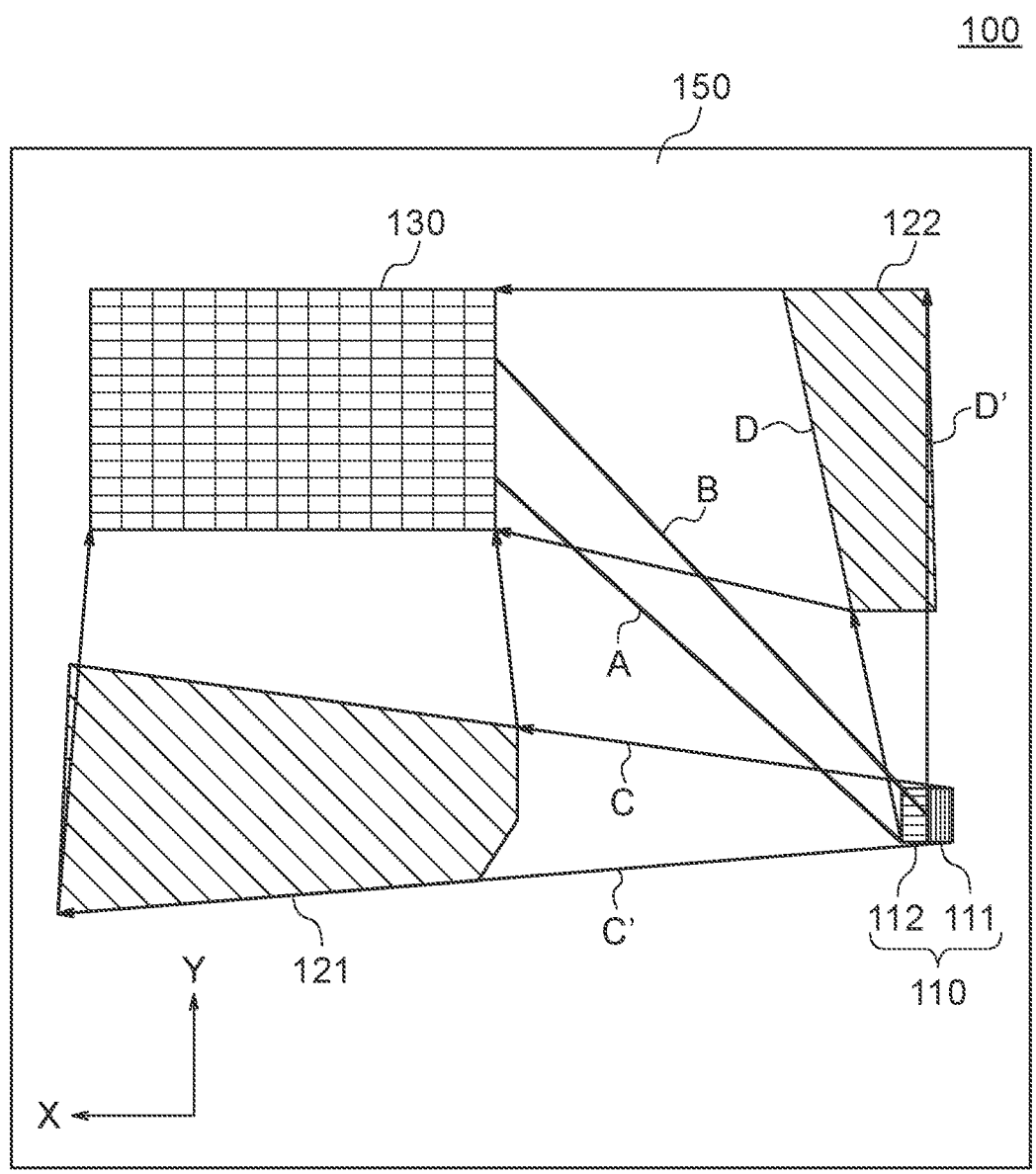
FIG. 22 shows an example of a light guiding apparatus in which a stary light prevention mechanism is provided.

FIG. 22 shows an example of a light guiding apparatus 100 in which a stary light prevention mechanism is provided.

Material of the light guiding substrate 150 provided with the light receiving unit 110, the first direction changing unit 121, the second direction changing unit 122 and the light emitting unit 130 is polycarbonate. Refractive index of light at the wavelength of 520 nanometers of the material is 1.6748. A thickness of the light guiding substrate 150 is 1.25 millimeters.

A light source 50 not shown in the drawing is a laser light source. The spot is 0.4 millimeters long in the direction of the x-axis and 0.8 millimeters long in the direction of the y-axis. The wavelength of light of the light source is 520 nanometers. A distance D between the light source 50 and the light receiving unit 110 is 6.3 millimeters.

The direction of the grating of the first unit 111 of the light receiving unit 110 is 0 degree, that is $\theta_1=0$ and the period of the grating is 410 nanometers. The direction of the grating of the second unit 112 of the light receiving unit 110 is 90 degrees, that is $\theta_2=90$ and the period of the grating is 460 nanometers. The direction of grooves of a grating is represented by an angle measured clockwise with respect to the direction of the y-axis. A boundary line that passes through the center of the light receiving unit 110 and is parallel to the y-axis divides the light receiving unit 110 into the first unit 111 and the second unit 112 in such a way that the area of the first unit 111 and that of the second unit 112 are equal to each other.

A light guiding apparatus according to the present invention is configured such that paths of rays of light that travel from the first unit to the light emitting unit run through the portion of the light guiding substrate on which the second unit is provided. Accordingly, rays of light that travel in the light guiding substrate as the first order diffracted light of both of the first unit 111 and the second unit 112 can be stray light. The stray light generated as described above is peculiar to a light guiding apparatus according to the present invention and should preferably be prevented.

In FIG. 22 the area between the straight lines C and C' is an area through which rays of the first order diffracted light of the first unit 111 of the light receiving unit 110 pass, that is a first path. The area between the straight lines D and D' is an area through which rays of the first order diffracted light of the second unit 112 of the light receiving unit 110 pass, that is a second path. The area between the straight lines A and B is an area through which paths of rays of possible stray light run, which will be described later.

Figure 23:
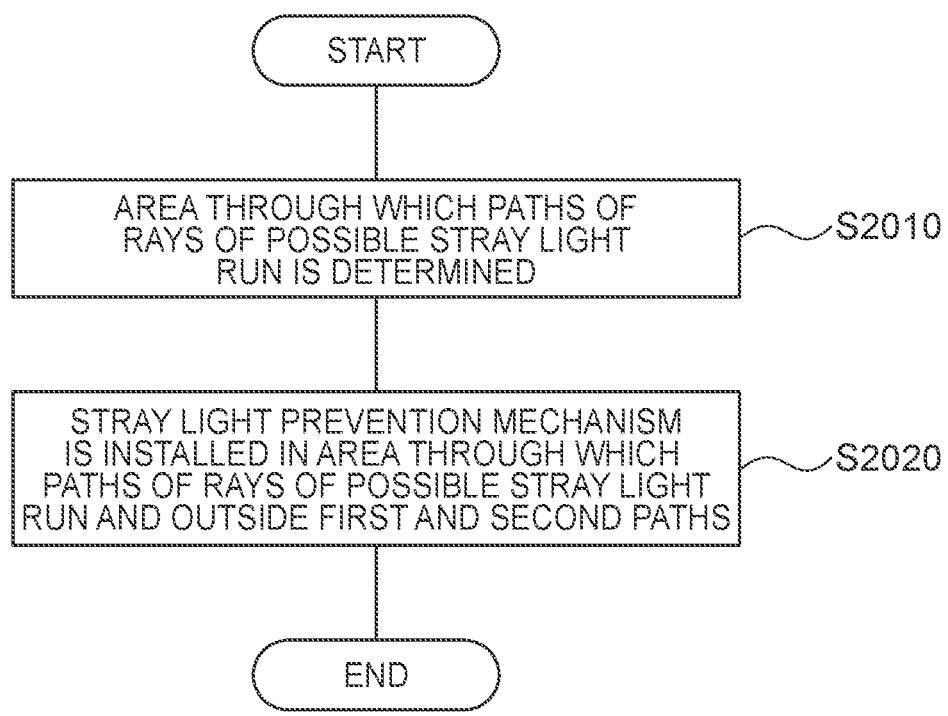
FIG. 23 is a flowchart for describing a method of producing a stray light prevention mechanism.

FIG. 23 is a flowchart for describing a method of producing a stray light prevention mechanism.

In step S2010 of FIG. 23 an area through which paths of rays of possible stray light run is determined.

Figure 24:
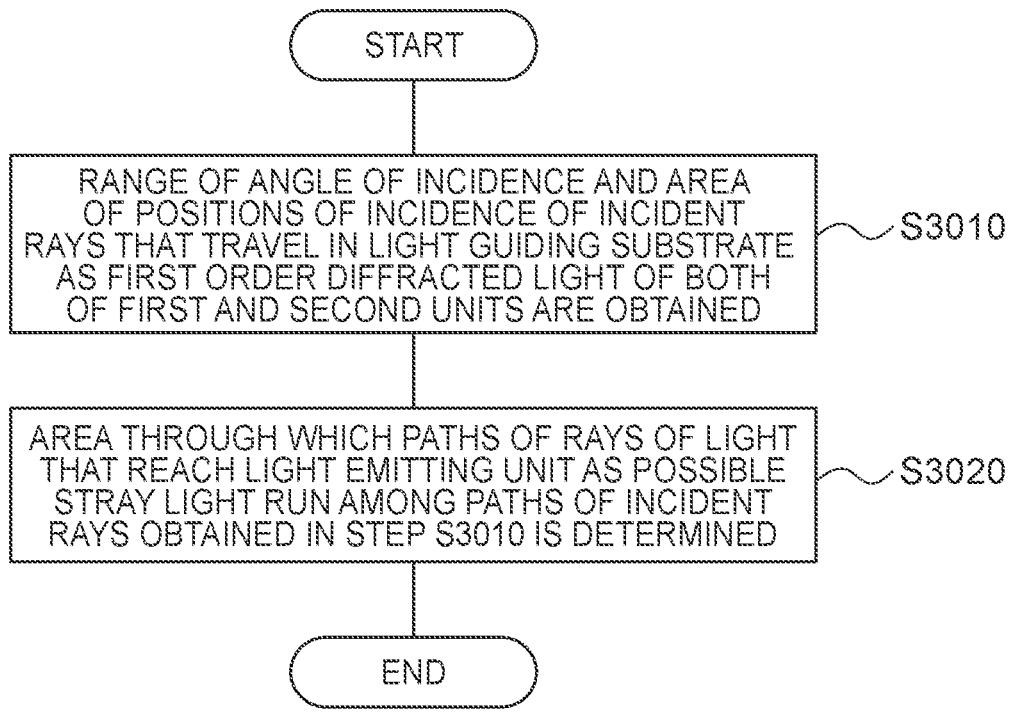
FIG. 24 is a flowchart for describing step S2010 of FIG. 23.

FIG. 24 is a flowchart for describing step S2010 of FIG. 23.

In step S3010 of FIG. 24 a range of angle of incidence and an area of positions of incidence of incident rays that travel in the light guiding substrate as the first order diffracted light of both of the first unit and the second unit of the light receiving unit are obtained.

Figure 25:
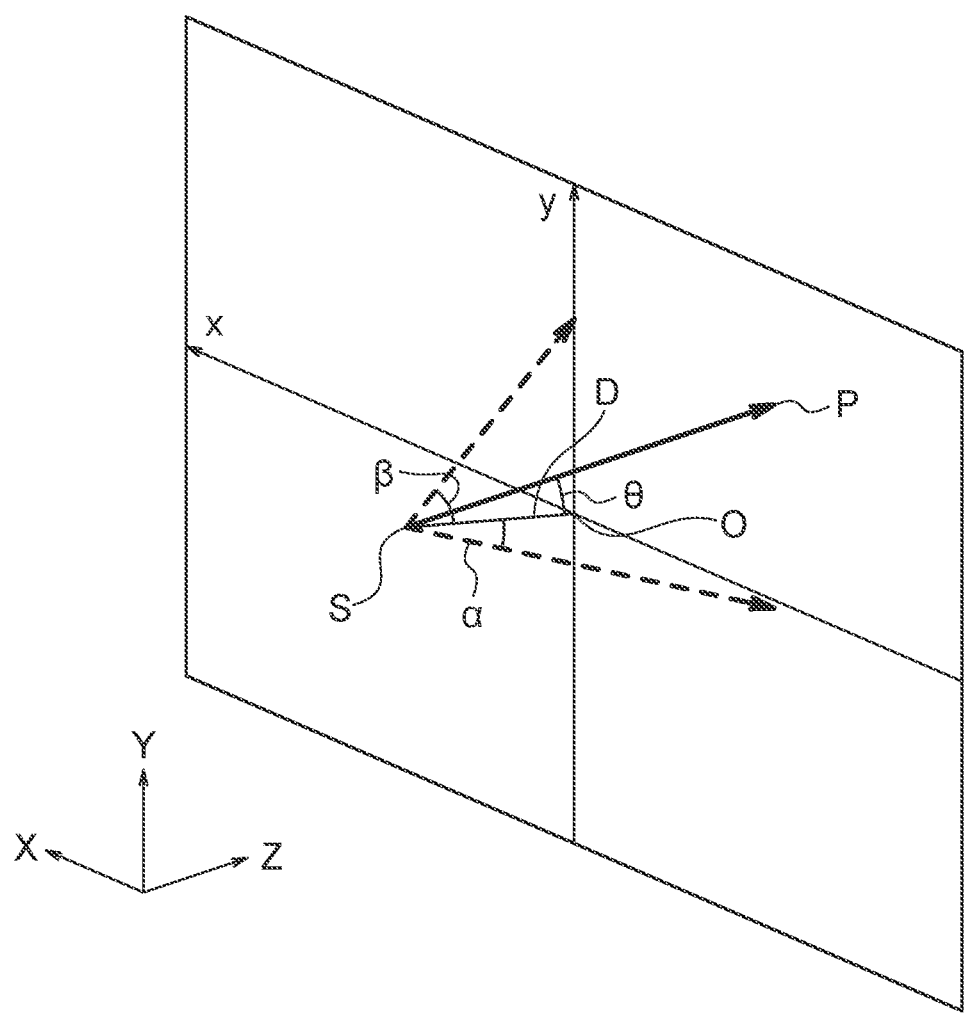
FIG. 25 shows an incident ray that enters the light guiding substrate at point P on a surface thereof.

FIG. 25 shows an incident ray that enters the light guiding substrate 150 at point P on a surface thereof. In the drawing point S represents a position of the center of the light source and ○ represents the origin on the surface of the light guiding substrate 150. The origin ○ is located at the center of the light receiving unit 110 and is the foot of the perpendicular from the point S to the surface of the light guiding substrate 150. An angle formed by the straight line that is a projection of the incident ray SP onto the xz plane and the straight line segment connecting point S and point ○ is represented by α and an angle formed by the straight line that is a projection of the incident ray SP onto the yz plane and the straight line segment connecting point S and point ○ is represented by β. Angle α and angle β are referred to respectively as x component and y component of the angle of incidence θ.

The wave vector $K_{in}$ of the incident ray can be expressed by the following expression.

$$k_{in} = \left\{ n \frac{2\pi}{\lambda} \sin(\alpha), n \frac{2\pi}{\lambda} \sin(\beta) \right\} \quad (8)$$

where n represents refractive index of air and λ represents wavelength of light of the light source.

The condition $K_1$ of the first order diffraction of the first unit 111 can be expressed by the following expression.

$$K_1 = \left\{ \frac{2\pi}{\Lambda_1} \cos\theta_1, \frac{2\pi}{\Lambda_1} \sin\theta_1 \right\} = \left\{ \frac{2\pi}{\Lambda_1}, 0 \right\} \quad (9)$$

Figure 26:
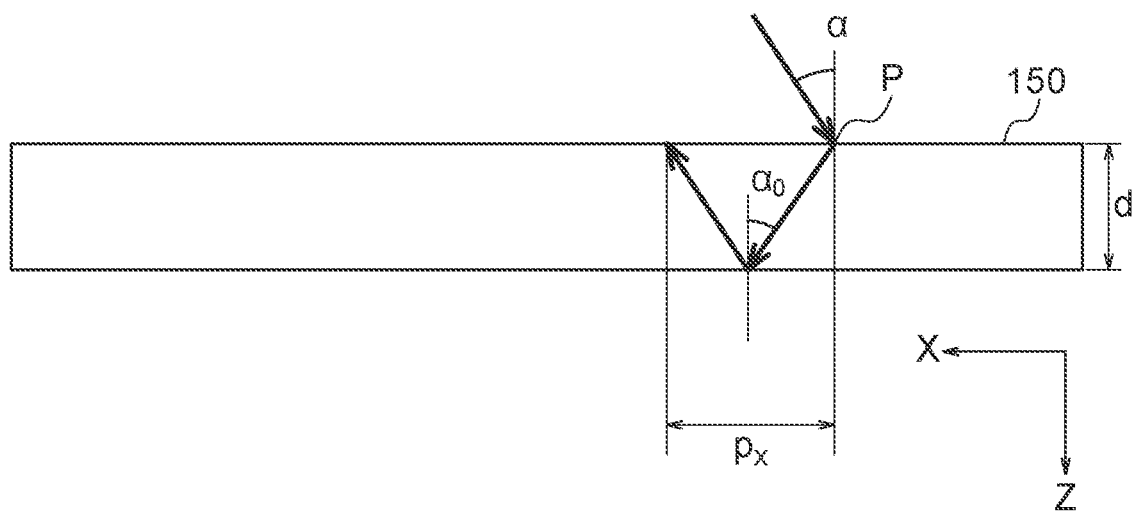
FIG. 26 shows a cross section that contains point P on the surface of the light guiding substrate and is parallel to the x-axis and the z-axis.

FIG. 26 shows a cross section that contains point P on the surface of the light guiding substrate 150 and is parallel to the x-axis and the z-axis. In FIG. 26 the light receiving unit is not shown for the sake of simplicity. The x component of angle of incidence of a ray that travels in the light guiding substrate 150 after having been diffracted by the first unit 111 is represented by $\alpha_0$.

Figure 27:
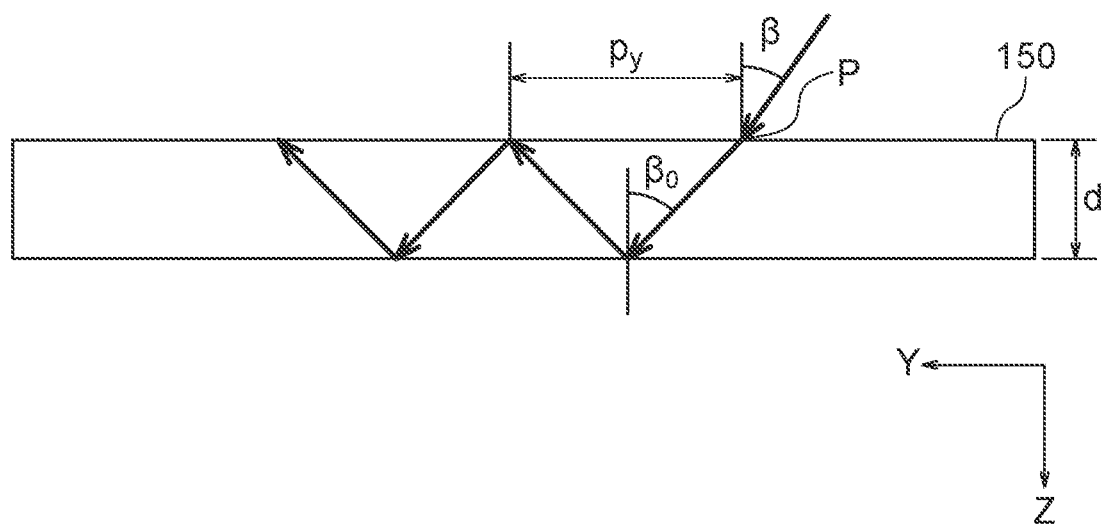
FIG. 27 shows a cross section that contains point P on the surface of the light guiding substrate and is parallel to the y-axis and the z-axis.

FIG. 27 shows a cross section that contains point P on the surface of the light guiding substrate 150 and is parallel to the y-axis and the z-axis. In FIG. 27 the light receiving unit is not shown for the sake of simplicity. The y component of angle of incidence of a ray that travels in the light guiding substrate 150 after having been diffracted by the first unit 111 is represented by $\beta_0$.

The following expression holds concerning angle of incidence $\alpha_0$ and angle of incidence $\beta_0$.

$$\left\{ n_d \frac{2\pi}{\lambda} \sin(\alpha 0), n_d \frac{2\pi}{\lambda} \sin(\beta 0) \right\} = k_{in} + K_1 \quad (10)$$

The above-described expression corresponds to Expression (1), which has been described previously.

When the x component of angle of incidence of a ray that travels in the light guiding substrate 150 after the diffracted light of the first order of the first unit 111 has been diffracted by the second unit 112 as the diffracted light of the first order are represented respectively by $\alpha_1$ and $\beta_1$, the wave vector $K_{out}$ of the above-described ray can be expressed by the following expression.

$$k_{out} = \left\{ n_d \frac{2\pi}{\lambda} \sin(\alpha 1), n_d \frac{2\pi}{\lambda} \sin(\beta 1) \right\} \quad (11)$$

The condition $K_2$ of the first order diffraction of the second unit 112 can be expressed by the following expression.

$$K_2 = \left\{ \frac{2\pi}{\Lambda_2} \cos\theta_2, \frac{2\pi}{\Lambda_2} \sin\theta_2 \right\} = \left\{ 0, \frac{2\pi}{\Lambda_2} \right\} \quad (12)$$

On the other hand, the following expression holds.

$$k_{out} = k_{in} + K_1 + K_2 \quad (13)$$

Accordingly, using Expressions (8) to (13) the relationships among (α, β), ($\alpha_0$, $\beta_0$) and ($\alpha_1$, $\beta_1$) can be obtained. Thus, the range of (α, β) that makes angles corresponding to ($\alpha_0$, $\beta_0$) and ($\alpha_1$, $\beta_1$) equal to or greater than the critical angle for total reflection can be obtained. In this way a range of angle of incidence (α, β) and an area of positions of incidence P of rays of light that travel in the light guiding substrate as the first order diffracted light of both of the first unit and the second unit of the light receiving unit can be obtained.

In step S3020 of FIG. 24 an area through which paths of rays of light that reach the light emitting unit 130 as possible stray light run among the paths of incident rays obtained in step S3010 is determined in consideration of positions of the first unit 111, the second unit 112, the first direction changing unit 121, the second direction changing unit 122 and the light emitting unit 130.

Figure 28:
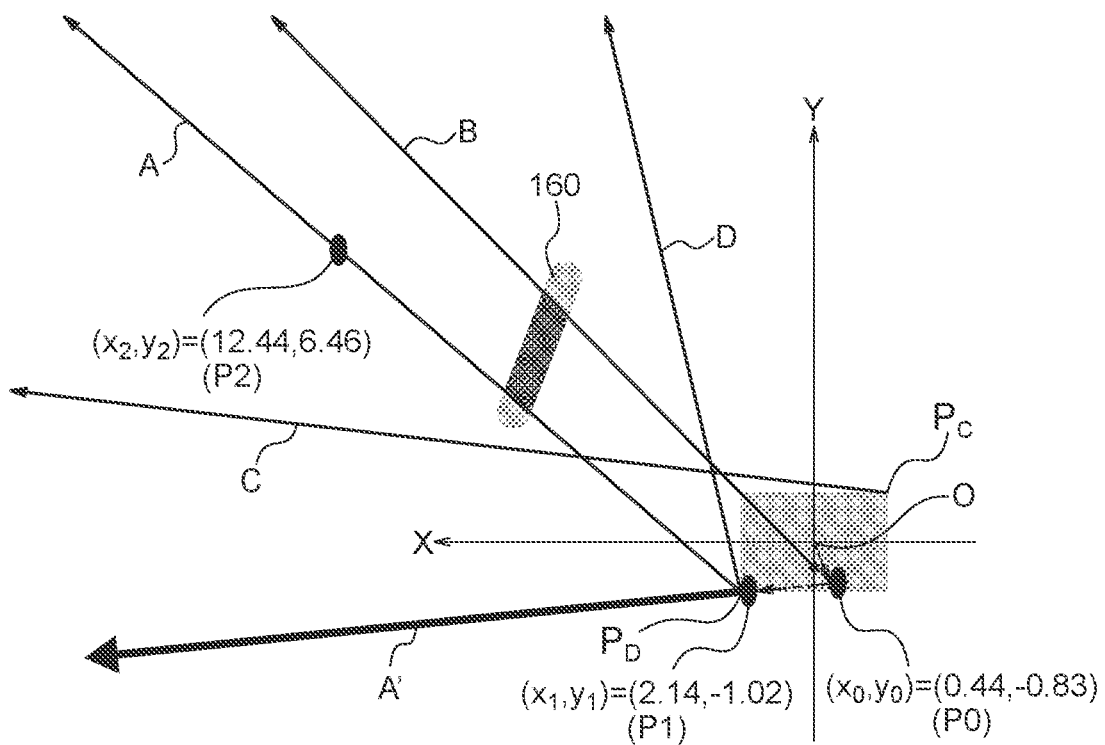
FIG. 28 is an enlarged view of the light receiving unit and the surrounding area in FIG. 22.

FIG. 28 is an enlarged view of the light receiving unit 110 and the surrounding area in FIG. 22. The angle of incidence of the ray of light that is represented by the straight line C is (α, β)=(−13.15°, 7.48°) and the position of incidence is represented by point $P_C$. The angle of incidence of the ray of light that is represented by the straight line D is (α, β)=(13.15°, −7.48°) and the position of incidence is represented by point $P_D$. Point $P_C$ and point $P_D$ are vertexes of a rectangle forming the boundary of the light receiving unit 110.

Among the rays of light that travel in the light guiding substrate 150 through total reflection as the first order diffracted light of both of the first unit 111 and the second unit 112, the rays of light having been obtained in step S3010, a path of a ray of light that runs in the vicinity of point $P_D$ in the second unit 112 is obtained in consideration of Expression (10). In FIG. 28 the above-described ray of light enters the first unit 111 at P0 and travels in the light guiding substrate 150 through total reflection up to point P1 of the second unit 112 as the first order diffracted light of the first unit 111. Point P1 is located in the vicinity of point $P_D$. Then, the above-described ray of light travels up to point P2 as the first order diffracted light of the second unit 112. Point P1 and point P2 are points at which the ray of light is reflected at the boundary of the substrate through total reflection. Coordinates of point P0, point P1 and point P2 are represented respectively by (x0,y0), (x1,y1) and (x2,y2). Then, the following equations hold.

(x1,y1)=(x0+m0·2d tan(α0), y0+m0·2d tan(β0))

(x2,y2)=(x0+m0·2d tan(α0)+m1·2d tan(α1), y0+m0·2d tan(β0)+m1·2d tan(β1))

In the equations described above m0 and m1 represent the number of total reflections of the first order diffracted light of the first unit 111 and that of the second unit 112, respectively. In the case shown in FIG. 28 m0 is 1 and m1 is 4.

Each of 2d tan($\alpha 0$), 2d tan($\beta 0$), 2d tan($\alpha 1$) and 2d tan($\beta 1$) represents a distance corresponding to the distance represented by $p_x$ in FIG. 26 or the distance represented by $p_y$ in FIG. 27.

Numerical data of the above-described ray of light are given below. The unit of angle is degree and the unit of length is millimeter.

($\alpha$, $\beta$)=(−4, −7.48)
($x_0$, $y_0$)=(−0.44, −0.83)
($\alpha_0$, $\beta_0$)=(45.86, −4.47)
($x_1$, $y_1$)=(2.14, −1.02)
($\alpha 1$, $\beta 1$)=(45.86, 36.79)
($x_2$, $y_2$)=(12.44, 6.46)

The path of the ray of light thus obtained and passing through point P0 ($x_0$, $y_0$), point P1 ($x_1$, $y_1$) and point P2 ($x_2$, $y_2$) is one of the boundaries of an area through which paths of rays of possible stray light run. In FIG. 22 and FIG. 28 the above-described boundary is represented by A. The other boundary of the area through which paths of rays of possible stray light run can be obtained in a similar way from a path of a ray of light that runs in the vicinity of the boundary of the first potion 111 and that of the second unit 112 among the rays of light that travel in the light guiding substrate 150 through total reflection as the first order diffracted light of both of the first unit 111 and the second unit 112, the rays of light having been obtained in step S3010. In FIG. 22 and FIG. 28 the other boundary described above is represented by B.

The straight line A' in FIG. 28 represents a path of a ray of light that enter the first unit 111 at point P0 and travels in the first path of the light guiding substrate 150 as the first order diffracted light of the first unit 111 and then as the $0^{th}$ order diffracted light of the second unit 112.

The above-described stray light is caused by rays of light that travel in the light guiding substrate as the first order diffracted light of both of the first unit 111 and the second unit 112 and is peculiar to a light guiding apparatus according to the present invention. As described above, an area through which paths of the stray light run can be determined by the positions of the light source, the first unit 111, the second unit 112, the first direction changing unit 121, the second direction changing unit 122 and the light emitting unit 130 and the periods of the one-dimensional diffraction gratings of the first unit 111 and the second unit 112.

In step S2020 of FIG. 23 a stray light prevention mechanism is installed in the area through which paths of rays of possible stray light run and outside the first and second paths.

FIG. 29 is a flow chart for describing step S2020 of FIG. 23.

In step S4010 of FIG. 29 values of intensity of rays of light and positions at which rays are reflected through total reflection are obtained in the area through which paths of possible stray light run, the area having been obtained in step S3020. The values of intensity of rays of light is obtained using simulation. Rays with a value of intensity that is greater than a predetermined value are regarded as rays of stray light. Rays with a value of intensity that is equal to or smaller than the predetermined value are negligible and are not regarded as rays of stray light. Further, positions at which respective rays are reflected through total reflection can be obtained in a way similar to the way that point P1 ($x_1$, $y_1$) and point P2 ($x_2$, $y_2$) are obtained.

In step S4020 of FIG. 29 a stray light prevention mechanism is installed in the area through which paths of possible stray light run and outside the first and second paths in consideration of the values of intensity of rays of light and positions at which rays are reflected through total reflection obtained in step S4010. In FIG. 28 the stray light prevention mechanism 160 is installed in the area through which paths of possible stray light run, that is, between the straight lines A and B and outside the first and second paths in order to intercept rays with a value of intensity that is greater than the predetermined value.

The stray light prevention mechanism nay be formed as a diffraction grating or a metasurface on a surface of the light guiding substrate 150 or a through hole of the light guiding substrate 150. The diffraction grating or the metasurface is installed in the vicinity of positions at which rays of light are reflected through total reflection.

In order to prevent the stray light prevention mechanism 160 from coming into view of a person using the light guiding apparatus, a difference in coordinate along the y-axis between the stray light prevention mechanism and the light emitting unit 130 should preferably be made as great as possible. Accordingly, the stray light prevention mechanism should preferably be located as close as possible to the light receiving unit 110. However, a too small distance between the stray light prevention mechanism the light receiving unit 110 causes problems in the producing process, such as welds generated in the process of injection molding and strain generated when a through hole is made after the molding, for example. Such welds and strain have a great influence on the optical performance of the light guiding apparatus. Accordingly, a distance between the stray light prevention mechanism and the light receiving unit 110 should preferably be made greater than a value that is determined in such a way that problems in the producing process described above are not caused.

What is claimed is:

1. A light guiding apparatus comprising:
   a light guiding substrate that transmits rays of light through total internal reflection;
   a light receiving unit including a first unit and a second unit, each of the first unit and the second unit being a one-dimensional diffraction grating provided on a surface of the light guiding substrate, the first unit being configured so as to transmit received rays of light along a first path in the light guiding substrate as a first light beam, and the second unit being configured so as to transmit received rays of light along a second path in the light guiding substrate as a second light beam;
   a first direction changing unit configured to change the direction of the first light beam, the first direction changing unit being a one-dimensional diffraction grating provided on the surface;
   a second direction changing unit configured to change the direction of the second light beam, the second direction changing unit being a one-dimensional diffraction grating provided on the surface; and
   a light emitting unit configured to receive the first light beam from the first direction changing unit and the second light beam from the second direction changing unit and to combine the first light beam and the second light beam for emission of the combined light beam, the light emitting unit being a two-dimensional diffraction grating provided on the surface,
   wherein on the surface the center of the minimum circle encompassing the first unit is located farther away from the light emitting unit than the center of the minimum circle encompassing the second unit and the first path runs through the portion of the light guiding substrate on which the second unit is provided.

2. The light guiding apparatus according to claim 1, wherein in an area of the light receiving unit on the surface, the area being located farther away from the light emitting unit than the straight line that passes through the center of the minimum circle encompassing the light receiving unit and is parallel to grooves of the diffraction grating of the first unit, the second unit occupies 2% or more.

3. The light guiding apparatus according to claim 1, wherein in an area of the light receiving unit on the surface, the area being located closer to the light emitting unit than the straight line that passes through the center of the minimum circle encompassing the light receiving unit and is parallel to grooves of the diffraction grating of the first unit, the first unit occupies 10% or more.

4. The light guiding apparatus according to claim 1, wherein on the surface substrate line segments of the border line between the first unit and the second unit of the light receiving unit are defined so as to have two or more points of intersection with a straight line parallel to grooves of the first unit of the light receiving unit.

5. The light guiding apparatus according to claim 1, wherein on the surface all line segments of the border line between the first unit and the second unit are not parallel to one another and the maximum value of difference in angle of line segments or tangential lines of the border line with respect to a reference direction is 75 degrees or greater.

6. The light guiding apparatus according to claim 1, wherein on the surface at least one of the first unit and the second unit has two portions that are separated from each other by the other.

7. The light guiding apparatus according to claim 1, wherein an angle of inclination of grooves of the one-dimensional grating of the first unit from a y-axis is 5 degrees or smaller and an angle of inclination of grooves of the one-dimensional grating of the second unit from an x-axis is 15 degrees or smaller where the x-axis is defined so as to be parallel to the horizontal direction in use and the y-axis is defined so as to be parallel to the vertical direction in use.

8. The light guiding apparatus according to claim 1, wherein the period of the one-dimensional grating of the first unit is equal to or smaller than the period of the one-dimensional grating of the second unit.

9. The light guiding apparatus according to claim 1, wherein in an area of the light receiving unit on the surface, the area being located farther away from the light emitting unit than the straight line that passes through the center of the minimum circle encompassing the light receiving unit and is parallel to the direction designed to be vertical when the apparatus is in use, the second unit occupies 2% or more.

10. The light guiding apparatus according to claim 1, wherein in an area of the light receiving unit on the surface, the area being located closer to the light emitting unit than the straight line that passes through the center of the minimum circle encompassing the light receiving unit and is parallel to the direction designed to be vertical when the apparatus is in use, the first unit occupies 10% or more.

11. The light guiding apparatus according to claim 1, wherein a stray light prevention mechanism is installed in the area through which paths of rays of light that enter the first unit, travel in the light guiding substrate as the first order diffracted light of both of the first and second units and can reach the light emitting unit run and outside the first and second paths.

12. A method of producing a light guiding apparatus, the light guiding apparatus including:
a light guiding substrate that transmits rays of light through total internal reflection;
a light receiving unit including a first unit and a second unit, each of the first unit and the second unit being a one-dimensional diffraction grating provided on a surface of the light guiding substrate, the first unit being configured so as to transmit received rays of light along a first path in the light guiding substrate as a first light beam, and the second unit being configured so as to transmit received rays of light along a second path in the light guiding substrate as a second light beam;
a first direction changing unit configured to change the direction of the first light beam, the first direction changing unit being a one-dimensional diffraction grating provided on the surface;
a second direction changing unit configured to change the direction of the second light beam, the second direction changing unit being a one-dimensional diffraction grating provided on the surface; and
a light emitting unit configured to receive the first light beam from the first direction changing unit and the second light beam from the second direction changing unit and to combine the first light beam and the second light beam for emission of the combined light beam, the light emitting unit being a two-dimensional diffraction grating provided on the surface,
wherein on the surface the center of the minimum circle encompassing the first unit is located farther away from the light emitting unit than the center of the minimum circle encompassing the second unit and the first path runs through the portion of the light guiding substrate on which the second unit is provided, the method comprising the steps of:
obtaining a range of angle of incidence and an area of positions of incidence of incident rays of light that can travel in the light guiding substrate as the first order diffracted light of both of the first and the second units;
determining an area through which paths of rays of possible stray light that reach the light emitting unit run among the rays of light that can travel in the light guiding substrate as the first order diffracted light of both of the first and the second units; and
installing a stray light prevention mechanism in the area through which paths of rays of possible stray light run and outside first and second paths.

13. The method of producing the light guiding apparatus according to claim 12, wherein values of intensity of rays of light are obtained in the area through which paths of rays of possible stray light run and the stray light prevention mechanism is installed in the area through which paths of rays with values of intensity that are greater than a predetermined value run.

14. The method of producing the light guiding apparatus according to claim 12, wherein in the step of installing a stray light prevention mechanism, positions at which respective rays are reflected through total reflection are obtained in the area through which paths of rays of possible stray light run and the stray light prevention mechanism is installed in the vicinity of the positions at which rays of light are reflected through total reflection.

* * * * *